(12) United States Patent
Kobayashi et al.

(10) Patent No.: US 6,911,800 B2
(45) Date of Patent: Jun. 28, 2005

(54) STEPPING MOTOR CONTROLLER, SCANNING APPARATUS, AND IMAGE FORMING APPARATUS

(75) Inventors: Masato Kobayashi, Saitama (JP); Atsuo Tokunaga, Kanagawa (JP); Nobuhito Komoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 10/654,944

(22) Filed: Sep. 5, 2003

(65) Prior Publication Data

US 2004/0113581 A1 Jun. 17, 2004

(30) Foreign Application Priority Data

Sep. 6, 2002 (JP) .................................... 2002-262039

(51) Int. Cl.⁷ .............................................. G05B 19/40
(52) U.S. Cl. ..................... 318/685; 318/696; 318/560
(58) Field of Search ............................. 318/685, 696, 318/560, 650, 430, 431, 432

(56) References Cited

U.S. PATENT DOCUMENTS

| 5,673,187 A | 9/1997 | Tokunaga et al. |
| 5,881,339 A | 3/1999 | Yanagida et al. |
| 5,970,282 A | 10/1999 | Yanagida et al. |
| 6,072,703 A | 6/2000 | Tokunaga |
| 2003/0020423 A1 * | 1/2003 | Kameyama ............. 318/560 |
| 2003/0063023 A1 * | 4/2003 | Chen et al. ............ 341/144 |

FOREIGN PATENT DOCUMENTS

| JP | 5-56690 | 3/1993 |
| JP | 6-43050 | 2/1994 |
| JP | 11-215890 | 8/1999 |
| JP | 2000-23496 | 1/2000 |

* cited by examiner

*Primary Examiner*—Karen Masih
(74) *Attorney, Agent, or Firm*—Oblon, Spivak, McClelland, Maier & Neustadt, P.C.

(57) ABSTRACT

A stepping motor controller is disclosed that is capable of reducing power consumption of a stepping motor. The stepping motor controller includes a storage unit to store object values of a driving current of the stepping motor, an accumulation unit to accumulate an amount of operation of the stepping motor, and a driving current setting unit to read out an object value corresponding to the amount of operation from the storage unit and set the driving current to the object value. Alternatively, the stepping motor controller includes an accumulation unit that calculates a cumulative amount of operation of the stepping motor, and a driving current setting unit that, when the amount of operation is greater than a predetermined value, determines a critical out-of-step current of the stepping motor by changing in increments the value of the driving current of the stepping motor, and sets the critical out-of-step current with a predetermined margin added as an object driving current of the stepping motor.

12 Claims, 15 Drawing Sheets

“stepper motor”. In the present
STEPPING MOTOR CONTROLLER, SCANNING APPARATUS, AND IMAGE FORMING APPARATUS

BACKGROUND OF THE INVENTION

1. Field of the Invention

The present invention relates to a stepping motor controller, a scanning apparatus and an image forming apparatus including the stepping motor controller, such as a copy machine, a printer, or a facsimile.

It is known that "stepping motor" is also called "pulse motor", "step motor", or "stepper motor". In the present specification, the term "stepping motor" is used to represent any rotary motor or liner motor that generates electrical power by switching magnetic excitation states of magnetic poles therein, just as an electric motor does, which is given one of the names "stepping motor", "pulse motor", "step motor", or "stepper motor".

2. Description of the Related Art

Generally, an electric motor, for example, a stepping motor, generates electrical power by switching magnetic excitation states of magnetic poles therein. A basic characteristic of the stepping motor is that it has a portion movable due to an attractive force or a repulsive force resulting from a magnetic force, wherein the movable portion is moved by switching magnetic excitation states of the magnetic poles therein, and thereby, the position of the movable portion can be controlled with high precision.

The magnetic poles of the stepping motor are formed by the movable portion and stationary coils, and the movable portion is made up of permanent magnets or magnetic material. Generally, by switching the magnetic excitation states of the magnetic poles, an attractive force and a repulsive force are generated to drive the movable portion, and by fixing the magnetic excitation states of the magnetic poles, the movable portion is maintained at rest.

The structure of the stepping motor can be classified into a VR type (variable magnetic resistant), a PM type (permanent magnet), and a hybrid (HB) type that combines the above two. There have been manufactured stepping motors having two-phase magnetic poles, three-phase magnetic poles, four-phase magnetic poles, and five-phase magnetic poles.

A VR type stepping motor is driven by the attractive force between rotors that form teeth of the motor and stators of the magnetic poles. A PM type stepping motor is driven by the attractive force and repulsive force between a rotor formed by a permanent magnet having alternatively arranged N poles and S poles and stators of the magnetic poles. The HB type stepping motor has a structure combining those of the VR type and PM type.

In a range in which the rotating speed of the stepping motor does not change even though the load of an object driven by the motor changes, the inductance of the excitation coil does not change; therefore, in this case, the power consumption is constant when the rotating speed of the motor is constant or when the motor is at rest. In other words, when the load is light, power is wasted under the condition that the rotating speed of the motor is constant or the motor is at rest.

However, maintaining a constant rotating speed of the stepping motor means that the aforementioned movable portion should operate in a predetermined manner when switching the magnetic poles, and a magnetic force is required for driving the movable portion to correctly move among the magnetic poles that are being switched. After the required magnetic force is determined, using this magnetic force is sufficient if the load is constant. However, if the load changes and if the change is not clearly determined, a magnetic force corresponding to the maximum load variation has to be provided, in other words, the maximum excitation current has to be supplied.

By raising the excitation current, the driving torque rises, and the probability of the stepping motor being out-of-step becomes low. However, if an unnecessarily large current is supplied, power consumption rises. In addition, there arise problems such as vibration, noise, and heat of the motor. Therefore, it is desirable that the current be set to an appropriate value.

The following references show the related art.

Japanese Laid Open Patent Application No. 5-56690 discloses a method for setting the excitation current, including steps of measuring the driving current that does not cause out-of-step by gradually increasing the driving current of a stepping motor, and determining the driving current to be set for the stepping motor based on this measurement. In addition, during the operation, the actual current of the stepping motor is measured, and the actual current is adjusted to be the same as an object current value by feedback control.

Japanese Laid Open Patent Application No. 11-215890 discloses a motor controller that, by using a CPU, measures the driving current when out-of-step occurs by gradually decreasing the driving current of a stepping motor, and determines the usual driving current based on this measurement.

Japanese Laid Open Patent Application No. 6-43050 discloses a method of measuring an actual load torque of a stepping motor coupled with load machinery.

Japanese Laid Open Patent Application No. 2000-23496 discloses a step motor controller equipped with a computer for measuring out-of-step.

When setting a constant excitation current flowing in magnetic poles, which rotate at a constant speed in a driving system, the reliability of the system in avoiding the out-of-step condition is not certain. Generally, this reliability is estimated by multiplying a coefficient greater than one by the out-of-step current while decreasing the excitation current. This estimation is good if the coefficient is empirically determined.

In the aforementioned case of a stepping motor driven by a constant current, the actual driving current is calculated or measured beforehand; taking into consideration the fluctuation or time variation of the load, the value of the driving current is set to a value capable of driving an expected largest load so as to enable driving having a sufficiently large safety margin. Adversely, power consumption of the motor rises, and much heat is generated.

SUMMARY OF THE INVENTION

Accordingly, it is a general object of the present invention to solve one or more problems of the related art.

A specific object of the present invention is to provide a stepping motor controller capable of reducing power consumption of a stepping motor, and a scanning apparatus and an image forming device having the stepping motor controller.

According to a first aspect of the present invention, there is provided a stepping motor controller for setting a driving current of a stepping motor, including: a storage unit configured to store a plurality of object values of the driving current; an accumulation unit configured to accumulate an amount of operation of the stepping motor; and a driving current setting unit configured to read out one of the object values corresponding to the amount of operation from the storage unit and to set the driving current to the one of the object values.

Preferably, the object values of the driving current stored in the storage unit are determined by using a relation between the amount of operation and a driving torque of the stepping motor for driving the amount of operation, and a relation between the driving current and the driving torque generated by the driving current; and the object values of the driving current are stored in the storage unit in conjunction with the amounts of operation of the stepping motor, respectively.

According to the present invention, in a system including a stepping motor and load machinery that is coupled to and driven by the stepping motor, when the load changes in the course of the operation of the stepping motor, load torques of the system corresponding to different amounts of operation of the stepping motor can be measured or predicted by calculations, for example, by using an identical testing stepping motor. The amount of operation of the stepping motor, for example, may be the cumulative operation time, or the cumulative number of times of operation. Based on a relation between the driving current flowing in the stepping motor and the resulting generated torque of the stepping motor, it is possible to calculate a driving current for generating a required torque. For example, the required torque is obtained by adding a safety margin to the calculated torque. The required driving currents obtained in this way are stored in the storage unit in conjunction with the amounts of operation, respectively. As a result, in the course of actual operation of the stepping motor, a sufficiently large driving current can be supplied to the stepping motor automatically, making it possible to reduce power consumption.

According to a second aspect of the present invention, there is provided a stepping motor controller for setting a driving current of a stepping motor, including: an accumulation unit configured to accumulate an amount of operation of the stepping motor; and a driving current setting unit configured to, when the amount of operation is greater than a predetermined value, determine a critical out-of-step current of the stepping motor by changing in increments the driving current of the stepping motor, and set the critical out-of-step current with a predetermined margin added as an object driving current of the stepping motor.

Preferably, the stepping motor controller further comprises a monitoring unit configured to monitor for an out-of-step state of the stepping motor driven by the driving current, and increase the driving current when the out-of-step state is detected.

According to a third aspect of the present invention, there is provided a scanning apparatus, including: a document scanning unit configured to scan a document; an image data reader configured to convert an image on the document into image data; a stepping motor configured to drive the document scanning unit to move; and a stepping motor controller for setting a driving current of the stepping motor, said stepping motor controller including: a storage unit configured to store a plurality of object values of the driving current; an accumulation unit configured to accumulate an amount of operation of the stepping motor; and a driving current setting unit configured to read out one of the object values corresponding to the amount of operation from the storage unit and to set the driving current to the one of the object values.

According to a fourth aspect of the present invention, there is provided a scanning apparatus, including: a document scanning unit configured to scan a document; an image data reader configured to convert an image on the document into image data; a stepping motor configured to drive the document scanning unit to move; and a stepping motor controller for setting a driving current of the stepping motor, said stepping motor controller including: an accumulation unit configured to accumulate an amount of operation of the stepping motor; and a driving current setting unit configured to, when the amount of operation is greater than a predetermined value, determine a critical out-of-step current of the stepping motor by changing in increments the driving current of the stepping motor, and set the critical out-of-step current, with a predetermined margin added, as an object driving current of the stepping motor.

According to a fifth aspect of the present invention, there is provided an image forming apparatus, including: an image forming device that irradiates a laser beam to a photoconductor to form a static latent image thereon, develops the static latent image, and transfers the developed static latent image to paper; a stepping motor that drives a machinery portion of the image forming device to make mechanical motions; and a stepping motor controller for setting a driving current of the stepping motor, said stepping motor controller including: a storage unit configured to store a plurality of object values of the driving current; an accumulation unit configured to accumulate an amount of operation of the stepping motor; and a driving current setting unit configured to read out one of the object values corresponding to the amount of operation from the storage unit and to set the driving current to the one of the object values.

According to a sixth aspect of the present invention, there is provided an image forming apparatus, including: an image forming device that irradiates a laser beam to a photoconductor to form a static latent image thereon, develops the static latent image, and transfers the developed static latent image to paper; a stepping motor that drives a machinery portion of the image forming device to make mechanical motions; and a stepping motor controller for setting a driving current of the stepping motor, said stepping motor controller including: an accumulation unit configured to accumulate an amount of operation of the stepping motor; and a driving current setting unit configured to, when the amount of operation is greater than a predetermined value, determine a critical out-of-step current of the stepping motor by changing in increments the value of a driving current of the stepping motor, and set the critical out-of-step current with a predetermined margin added as an object driving current of the stepping motor.

These and other objects, features, and advantages of the present invention will become more apparent from the following detailed description of preferred embodiments given with reference to the accompanying drawings.

BRIEF DESCRIPTION OF THE DRAWINGS

FIGS. 9A through 9C are graphs showing methods of determining the required object currents Cfr and Crr, in which: FIG. 9A is a graph showing the time dependence of the required load torque; FIG. 9B is a graph showing the relation between the excitation current and the resulting torque; and FIG. 9C is a graph showing the dependence of the required object current on the cumulative operation time obtained from graphs in FIG. 9A and FIG. 9B;

In FIG. 14 change "DRC3" to "DRC4".) executed by the CPU 254 of the scanner control circuit 206 in the fourth embodiment.

DESCRIPTION OF THE PREFERRED EMBODIMENTS

Figure 1:
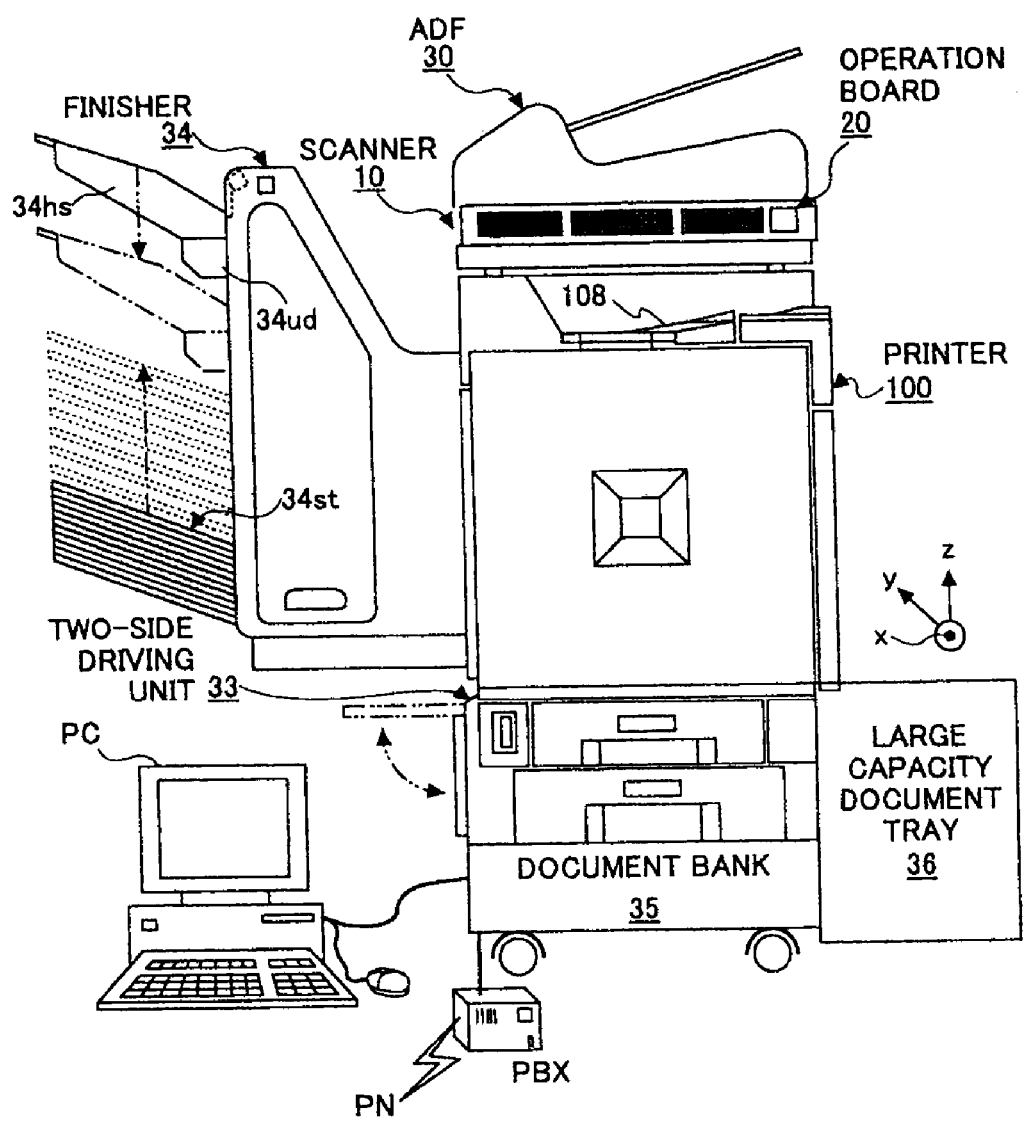
FIG. 1 is a schematic view of a multi-function full-color digital copy machine according to a first embodiment of the present invention.

Below, preferred embodiments of the present invention are explained.

(1) A stepping motor controller of the present invention may include a storage unit, an accumulation unit, and a driving current setting unit.

The storage unit stores object values of a driving current of the stepping motor, with the object values of the driving current to be set in conjunction with the cumulative operation time of the stepping motor. The accumulation unit calculates the cumulative operation time of the stepping motor. The driving current setting unit reads out one object value corresponding to a required cumulative operation time from the storage unit and sets the driving current to be equal to the object value.

Such a stepping motor controller enables reduced power consumption.

(2) Alternatively, a stepping motor controller of the present invention may include a storage unit, an accumulation unit, and a driving current setting unit.

The storage unit stores object values of the driving current with the object values of the driving current to be set in conjunction with the cumulative number of times of operating the stepping motor. The accumulation unit calculates the cumulative number of times of operating the stepping motor. The driving current setting unit reads out one object values of the driving current corresponding to a required cumulative number of times of operation from the storage unit and sets the driving current to be equal to the object value.

Such a stepping motor controller enables reduced power consumption.

(3) In the stepping motor controllers described in (1) and (2) above, the object values of the driving current stored in the storage unit may be determined based on a relation between the operation time or the number of times of operation and a driving torque of the stepping motor, and a relation between the driving current and the driving torque generated by the driving current. Furthermore, the object values of the driving current may be stored in the storage unit as a function of the operation time or the number of times of operation.

(4) In the stepping motor controllers described in (1) and (2) above, the object values of the driving current stored in the storage unit may also be values of currents equal to critical out-of-step object currents with a safety margin added. The critical out-of-step object currents may be determined by incrementally changing the current flowing in the stepping motors.

(5) A stepping motor controller of the present invention may include an accumulation unit and a driving current setting unit. The accumulation unit calculates a cumulative amount of operation of the stepping motor. The driving current setting unit, when the amount of operation is greater than a predetermined value, determines critical out-of-step object currents of the stepping motor by incrementally changing the current flowing in the stepping motor. The driving current setting unit adds a safety margin to the critical out-of-step object current, and sets the resulting current value as the object driving current, and then initializes the amount of operation in the accumulation unit to zero.

Due to such a stepping motor controller, it is possible to reduce the probability of out-of-step occurring, and reduce the power consumption.

(6) A stepping motor controller of the present invention may include an accumulation unit and a driving current setting unit. The accumulation unit calculates a cumulative operation time of the stepping motor. The driving current setting unit, when the cumulative operation time is greater than a predetermined value, determines a critical out-of-step object current of the stepping motor by incrementally changing the current flowing in the stepping motor. The driving current setting unit adds a safety margin to the critical out-of-step object current, sets the resulting current value as the object driving current, and then initializes the value of the operation time in the accumulation unit to zero.

Due to such a stepping motor controller, it is possible to reduce the probability of out-of-step occurring, and reduce the power consumption.

(7) A stepping motor controller of the present invention may include an accumulation unit and a driving current setting unit. The accumulation unit calculates a cumulative number of times of operating the stepping motor. The driving current setting unit, when the cumulative number of times of operation is greater than a predetermined value, determines a critical out-of-step object current of the stepping motor by incrementally changing the current flowing in the stepping motor. The driving current setting unit adds a safety margin to the critical out-of-step object current, and sets the resulting current value as the object driving current, and then initializes the value of the operation time in the accumulation unit to zero.

Due to such a stepping motor controller, it is possible to reduce the probability of out-of-step occurring, and reduce the power consumption.

(8) The above stepping motor controllers of the present invention may further include a monitoring unit for monitoring whether the stepping motor driven with a driving current falls into an out-of-step state. If the out-of-step state is detected, the monitoring unit increases the driving current.

Due to such a stepping motor, even if out-of-step occurs due to variation of the load, the driving current can be increased automatically, and this enables rapid recovery of the stepping motor from the out-of-step state.

(9) The stepping motor controllers of the present invention described in (1) through (8) above may be employed in a scanning apparatus. The scanning apparatus may include a scanning unit for scanning a document, a reading unit for converting an image on the document into image data, a stepping motor for driving the scanning unit to move, and a stepping motor controller as described above.

(10) The stepping motor controllers of the present invention described in (1) through (8) above may be employed in an image forming apparatus. The image forming apparatus may include an image forming device that irradiates a laser beam to a photoconductor to form a static latent image thereon, develops the static talent image, and transfers the developed static latent image to paper; a stepping motor that drives a machinery portion of the image forming device to make mechanical motions; and a stepping motor controller as described above.

(11) The present invention may be implemented as a driving device. The driving device may include a driving unit that drives a load using a pulse excitation driving unit, a storage unit that stores a cumulative driving time of the pulse excitation driving unit, and a driving current setting unit that sets a driving current of the pulse excitation driving unit. In the driving device, the setting value of the driving current of the pulse excitation driving unit is modified according to the cumulative operation time.

In the above driving device, because the value of the driving current of the pulse excitation driving unit can be modified, the driving current may be set corresponding to the actual load, and this can reduce power consumption and heat generation.

(12) In the driving device described in (11) above, the data stored in the storage unit may include data of the driving current to be set, which are determined based on a relation between the operation time and a torque of the pulse excitation driving unit, and a relation between the driving current and the torque generated by the driving current of the pulse excitation driving unit.

In the above driving device, because the value of the driving current of the pulse excitation driving unit can be modified based on the driving current data stored in the storage unit, it is possible to set an optimum driving current, and this can reduce power consumption and heat generation.

(13) The driving device described in (12) above may further include a detection unit for detecting out-of-step of the pulse excitation driving unit, and a driving current variation unit for changing the driving current of the pulse excitation driving unit. The detection unit can detect a critical out-of-step current by using the driving current variation unit to change the driving current. The driving current data stored in the storage unit may be determined from the critical out-of-step current.

Due to the above driving device, because the value of the driving current of the pulse excitation driving unit can be modified based on the driving current data created according to the actual out-of-step condition and stored in the storage unit, it is possible to set an optimum driving current, and this can reduce power consumption and heat generation.

(14) As an alternative to the driving devices described in (11) through (13) above, the driving device of the present invention may include a driving unit that drives a load using a pulse excitation driving unit, a storage unit that stores a cumulative number of times of operation of the pulse excitation driving unit, and a driving current setting unit that sets a driving current of the pulse excitation driving unit. In the driving device, the setting value of the driving current of the pulse excitation driving unit is modified according to the cumulative number of times of operation.

Due to the above driving device, because the value of the driving current of the pulse excitation driving unit can be modified based on the cumulative number of times of operation from the time of starting the device to the time of stopping the device, instead of the cumulative operation time, it is possible to configure a driving device with a counter used for counting the number of times of operation.

(15) The driving devices described in (11) through (14) above may further include an out-of-step detection unit for detecting whether out-of-step occurs. If the out-of-step state is detected, regardless of the data value stored in the storage unit, the driving current is changed to an appropriate value that will correct the out-of-step.

Due to this driving device, when out-of-step is detected, if a current larger than the data value stored in the storage unit is selected, the driving current can be changed to a value having a sufficiently large safety margin. Therefore, it is possible to prevent the pulse excitation driving unit from losing control because of rapid change of the load.

Below, examples of the preferred embodiments of the present invention are explained with reference to the accompanying drawings.

First Embodiment

FIG. 1 is a schematic view of a multi-function full-color digital copy machine according to a first embodiment of the present invention.

The multi-function full-color digital copy machine shown in FIG. 1 includes an ADF 30 (Auto Document Feeder), an operational board 20, a color scanner 10, a color printer 100, and a paper bank 35. In addition, a finisher 34, attached to the printer 100, has a stapler and a tray for holding documents with images formed thereon, a two-side driving unit 33, and a large capacity paper tray 36.

The multi-function full-color digital copy machine is connected to a LAN (Local Area Network) through a system controller (refer to FIG. 4), and computers are connected to the LAN.

Figure 2:
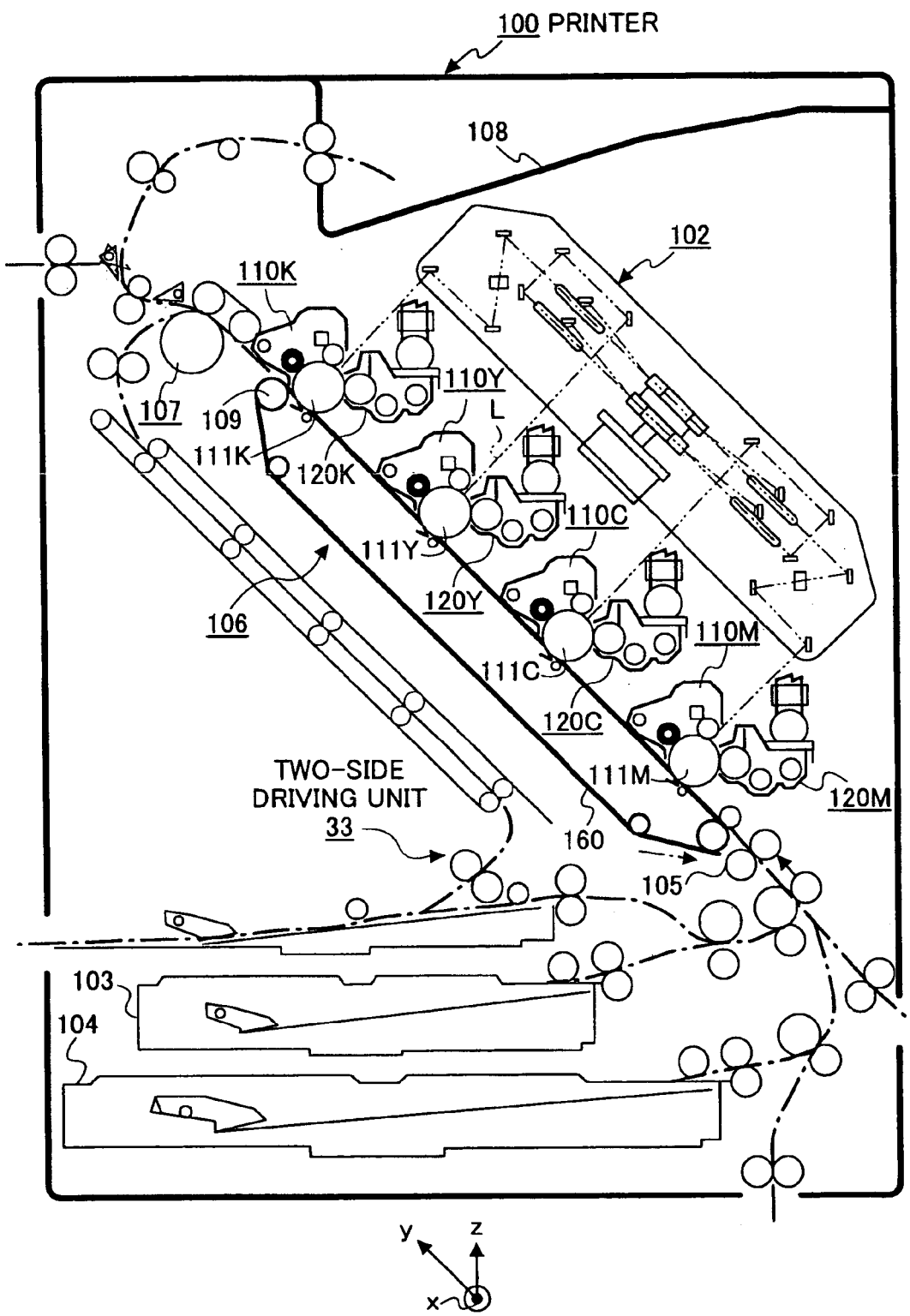
FIG. 2 is a schematic view showing a configuration of the color printer 100 in FIG. 1.

FIG. 2 is a schematic view showing a configuration of the color printer 100. For example, the color printer 100 is a laser printer. This laser printer 100 includes four toner image formation units for forming images in magenta (M), cyan (C), yellow (Y), and black (K) (Note: "B" is normally reserved for blue.) colors, respectively, and the four toner image formation units are arranged in the order of M, C, Y, K along the moving direction of the paper for transferring toner images thereto (also referred to as transfer paper where necessary), that is, along the Y axis from the right bottom to the left top in FIG. 2, forming an image forming device having four drums in tandem.

The magenta (M), cyan (C), yellow (Y), and black (K) toner image formation units have photo-conducting units 110M, 110C, 110Y, and 110K, and developing units 120M, 120C, 120Y, and 120K, respectively. The photo-conducting units 110M, 110C, 110Y, and 110K include photo-conducting drums 111M, 111C, 111Y, and 111K, respectively. Each of the toner image formation units is arranged at regular pitches in a line along the Y direction (the sub scan direction), which is the moving direction of the paper for transferring toner images thereto, and in such a manner that the rotating axis of each of the photo-conducting drums 111M, 111C, 111Y, and 111K is parallel to the horizontal X axis (the main scan direction).

In addition to the toner image formation units, the laser printer 100 also includes a scanning laser irradiation unit 102, paper cassettes 103 and 104, a pair of resist rollers 105, a transferring conveying belt unit 106 having a transfer conveying belt 160 for carrying and conveying the paper for transferring toner images thereto so that the transfer paper passes through the transfer positions of the toner image formation units, a fusing unit 107 working by means of belt fusing, a document delivery tray 108, and a two-side driving unit 33 (side reversal). Further, the laser printer 100 includes a not-illustrated tray for feeding paper manually, a toner supplement container, a bottle for containing waste toner, and others.

The laser irradiation unit 102 includes a light emitting source, a polygon mirror, an fθ lens, and a reflective mirror. The laser irradiation unit 102 emits laser beams and scans the laser beams according to input image data in the X (main scan) direction on the surfaces of the respective photo-conducting drums 111M, 111C, 111Y, and 111K.

In FIG. 2, the one-dot dashed line indicates the path of conveying the paper. The paper fed from the paper cassettes 103 and 104 is conveyed by conveying rollers while being directed by not-illustrated conveying guiding members, and the paper is conveyed to the pair of resist rollers 105. With the pair of resist rollers 105, the paper is fed to the transfer conveying belt 160 at a predetermined timing, and the transfer conveying belt 160 carries and conveys the paper so that the paper passes through the transfer positions of the toner image formation units.

The toner images formed on the photo-conducting drums 111M, 111C, 111Y, and 111K of the respective toner image formation units are transferred to the paper carried and conveyed by the transfer conveying belt 160, and the images of different colors are superposed on the paper, forming a color image thereon. The paper with the color image formed thereon is conveyed to the fusing unit 107. This is the so-called direct transfer method, that is, the individual toner images are transferred to the paper directly. When the paper passes through the fusing unit 107, the superposed toner images are fused on the paper. The paper on which the toner images are fused is delivered to the document delivery tray 108, or the finisher 34, or conveyed to the two-side driving unit 33.

Among the four photo-conducting drums, the photo-conducting drums 111M, 111C, 111Y for forming magenta, cyan and yellow toner images, respectively, are driven by a not-illustrated stepping motor (referred to as color drum motor below) through a not-illustrated power transmission system. The photo-conducting drum 111K for forming a black toner image is driven by a not-illustrated stepping motor (referred to as black drum motor below) through the not-illustrated power transmission system. The transfer conveying belt 160 moves when the transferring driving rollers are driven by the black drum motor through the power transmission system. Therefore, the black drum motor drives the photo-conducting drum 111K and the transfer conveying belt 160, and the color drum motor drives the photo-conducting drums 111M, 111C, and 111Y.

The developing unit 120K is driven by a not-illustrated DC motor, which also drives the fusing unit 107, through the power transmission system and a not-illustrated clutch. The developing units 120M, 120C and 120Y are driven by a not-illustrated stepping motor, which also drives the resist rollers 105, through the power transmission system and a not-illustrated clutch.

The resist rollers 105 and the developing units 120M, 120C, 120Y and 120K are not being driven constantly, but driven at predetermined timings through clutches to control the power transmission.

A rotary encoder is connected to each of the stepping motors mentioned above, by which a not-illustrated motor control unit determines the values of the object driving currents of the stepping motors, and supplies excitation currents equivalent to the object driving currents to the stepping motors.

Below, as an example, the toner image formation unit for forming a yellow toner image is described in detail. The toner image formation units for forming images of other colors have the same configurations.

As described above, the yellow (Y) toner image formation unit has the photo-conducting unit 110Y and the developing unit 120Y. The photo-conducting unit 110Y includes the photo-conducting drum 111Y, and a brush roller for applying a lubricant to the surface of the photo-conducting drum 111K, a swingable plate for cleaning the surface of the photo-conducting drum 111Y, a discharging lamp for irradiating light to the surface of the photo-conducting drum 111Y, and a non-contacting charging roller for uniformly charging the surface of the photo-conducting drum 111Y.

In the photo-conducting unit 110Y, an alternating voltage is applied on the charging roller, and thereby, the charging roller uniformly charges the surface of the photo-conducting drum 111Y. The laser beams emitted from the laser irradiation unit 102 and modulated according to the image data are deflected by the polygon mirror in the X direction, and thereby the laser beams scan the uniformly charged surface of the photo-conducting drum 111Y, and a static latent image is formed on the surface. The static latent image on the surface of the photo-conducting drum 111Y is developed by the developing unit 120Y, resulting in a yellow toner image. This yellow toner image is transferred to the paper carried and conveyed by the transfer conveying belt 160 at a position where the paper passes through. After the transfer, a certain amount of lubricant is applied to the surface of the photo-conducting drum 111Y by the brush roller, the surface is cleaned by the swingable plate, and the surface is discharged by light from the discharging lamp. Then the photo-conducting drum 111Y is ready for forming the next static toner image.

The developing unit 120Y contains a binary composition developing material including magnetic carriers and negatively charged toner. The developing unit 120Y includes a developing roller arranged to be partially exposed from an opening on the photo-conducting drum side of the developing unit 120Y, a conveying screw, a doctor blade, a toner density sensor, and a powder pump.

The developing material contained in a developing case is agitated and conveyed by the conveying screw, and is frictionally charged. Then, part of the developing material is deposited on the surface of the developing roller. The doctor blade makes the thickness of the developing material on the surface of the developing roller uniform. The toner in the developing material on the surface of the developing roller is moved to the photo-conducting drum 11Y, and thereby a toner image corresponding to the static latent image is created on the photo-conducting drum 11Y. The density of the toner in the developing material in the developing case is determined by the toner density sensor. When the density is not sufficient, the powder pump is driven to supplement the developing material with toner.

The transfer conveying belt 160 in the transferring conveying belt unit 106 is wound on four tensioning rollers so as to pass through the transfer positions of the photo-conducting drums 111M, 111C, 111Y, and 111K, consecutively. Two of the four tensioning rollers are arranged so that an electrostatic roller, to which a voltage is applied by a power supply, faces an entrance roller positioned on the upstream side in the paper moving direction represented by the one-dot dashed line. The paper passing between these two rollers is adhered to the transfer conveying belt 160 by an electrostatic force. An exit roller positioned on the downstream side in the paper moving direction is a driving roller that frictionally drives the transfer conveying belt 160, and is connected to a not-illustrated driving source. On the periphery of the transfer conveying belt 160, a biased roller is arranged to be in contact with the surface of the transfer conveying belt 160, and a voltage for cleaning is applied to the biased roller from the power supply. With the biased roller, foreign substances adhering to the transfer conveying belt 160 can be removed.

Transfer bias applying members are formed to be in contact with the back surface of the transfer conveying belt 160 and face the photo-conducting drums 111M, 111C, 111Y, and 111K. These transfer bias applying members may be brushes made of mylar and fixed at the respective transfer positions of the photo-conducting drums 111M, 111C, 111Y, and 111K. To each of the transfer bias applying members, a transfer voltage is applied from the respective transfer bias power supply. Due to the transfer biases applied by the transfer bias applying members, transfer charges are deposited on the transfer conveying belt 160, forming a transfer electric field of a certain strength at each of the respective transfer positions between the transfer conveying belt 160 and the surfaces of the photo-conducting drums 111M, 111C, 111Y, and 111K.

The paper conveyed by the transfer conveying belt 160, to which those different toner images formed on the photo-conducting drums 111M, 111C, 111Y, and 111K are transferred, is fed to the fusing unit 107, where the superposed toner images are fused on the paper by heating due to pressure. Here, paper formed with images is called a document. After the thermal fusing, the document is fed to the finisher 34 through a delivery port, or alternatively, delivered to the document delivery tray 108 on the top of the laser printer 100, for example.

The finisher 34 has a stack tray 34hs and a group of sort trays 34st (Note: In FIG. 1 it is "34st".), as shown in FIG. 1, and the laser printer 100 may deliver the document to the stack tray 34hs (called stacker mode) or to the sort trays 34st (called sorter mode) to sort the documents into different copies.

Figure 3:
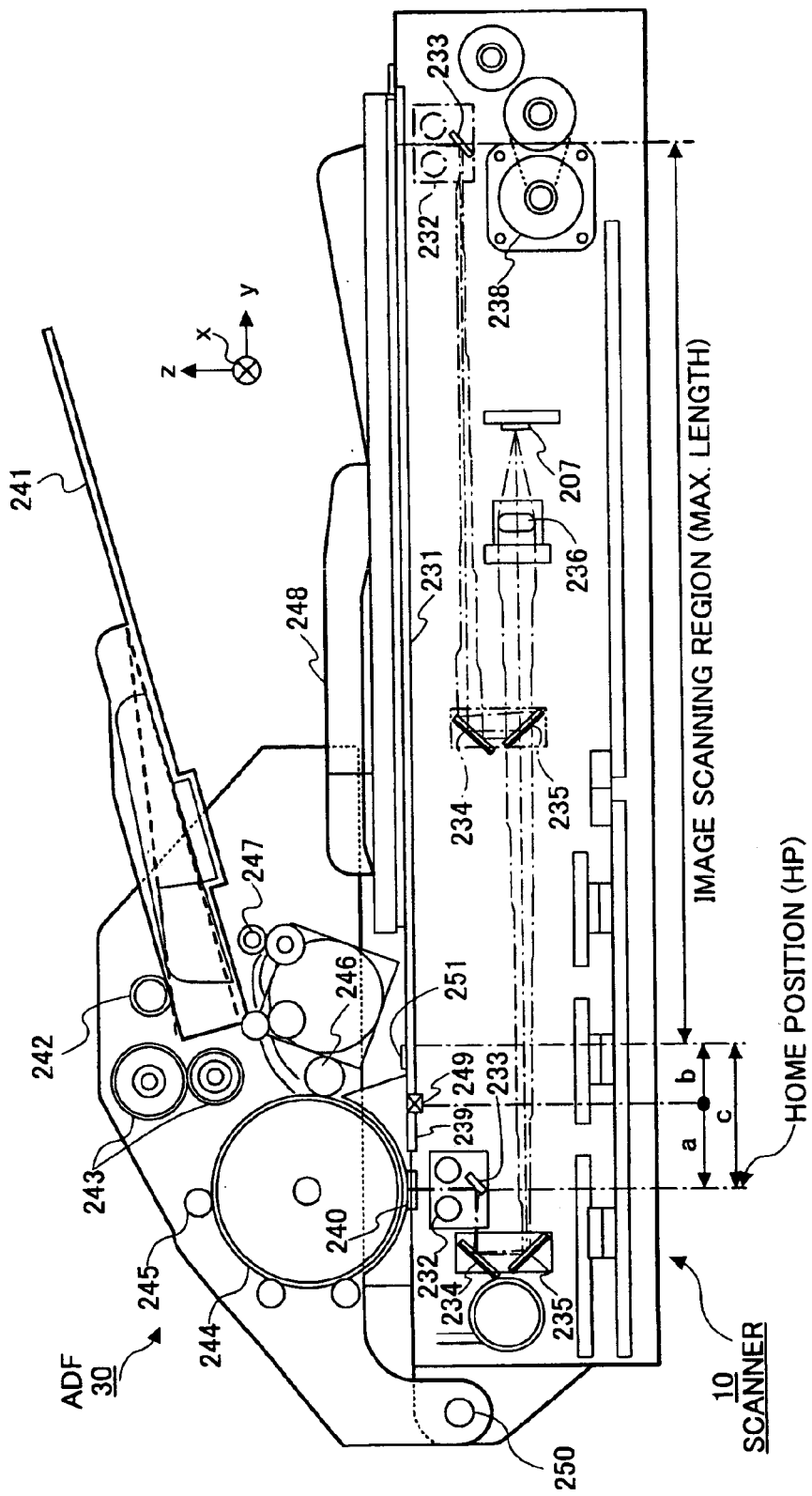
FIG. 3 is a schematic view showing a configuration of the color scanner 10 in FIG. 1, particularly, a document image reading unit of the ADF 30 attached to the color scanner 10.

FIG. 3 is a schematic view showing a configuration of the color scanner 10, specifically, a document image reader of the ADF 30 attached to the color scanner 10.

The color scanner 10 includes a contact glass 231, a lamp 232, mirrors 233, 234, 235, a lens 236, a CCD 207 (Charge Coupled Device, a photo sensor), and a driving motor 238.

A sheet of paper (document) with an image thereon is placed on the contact glass 231. The lamp 232 irradiates light to the document, and the reflective light from the document is reflected by the mirror 233 in the sub scan direction (that is, the Y direction). The lamp 232 and the mirror 233 are mounted on a not-illustrated first carriage, which is driven to move at a constant speed in the sub scan direction. The mirrors 234 and 235 are mounted to a not-illustrated second carriage, which is driven to move at a speed half of that of the first carriage in the sub scan direction.

The light reflected by the mirror 233 is reflected downward in the Z direction by the mirror 234, and is reflected by the mirror 235 in the sub scan direction again. And then, the light is condensed by the lens 236 to irradiate the CCD 207, whereby the incident light is converted into electric signals.

The first carriage and the second carriage are driven by the motor 238 to move forward and backward in the Y direction (the sub scan direction) to scan the document on the contact glass 231 and to return to the original position.

The ADF 30 attached to the color scanner 10 includes a document tray 241 for holding the original documents, a pickup roller 242, a pair of resist rollers 243, a conveying drum 244, a pressing roller 245 for pressing the document onto the conveying drum 244, a reading glass 240, delivery rollers 246, 247, and a delivery tray 248.

One of the original documents on the document tray 241 is picked up by the pickup roller 242, and is fed to the space between the conveying drum 244 and the pressing roller 245 by the pair of resist rollers 243. The document is in close contact with the conveying drum 244 and is conveyed to pass through above the reading glass 240. Then, the document is conveyed by the delivery rollers 246 and 247 onto the delivery tray 248 below the document tray 241. The delivery tray 248 also acts as a pressing plate.

When passing through the reading glass 240, the document is irradiated by the lamp 232, and the reflected light enters the mirror 233 and the subsequent optical system, and is converted into electric signals in the CCD 207.

The ADF 30 further includes a white reference plate 239 and a reference point sensor 249 for detecting the first carriage, which are provided between the reading glass 240 and a scale 251 for determining the position of the end of the document. The white reference plate 239 is used for shading correction. Shading is a phenomenon wherein the image data read by the color scanner 10 fluctuate notwithstanding a uniform density of the image on the original document, because of non-uniformity in the light emission strength of the lamp 232, the scanning operations in the main scan direction, and in the sensitivities of the photo-sensing elements in the CCD 207. To perform shading correction, before scanning the original document, a portion of the white reference plate 239 equivalent to one scanning line is read in the main scan direction, and the resulting white reference data are stored in a memory; in the course of reading the image on the original document, for each of the pixels in the image obtained by scanning the original document, the image data are divided by the corresponding white reference data (one scanning line) stored in the memory.

Figure 4:
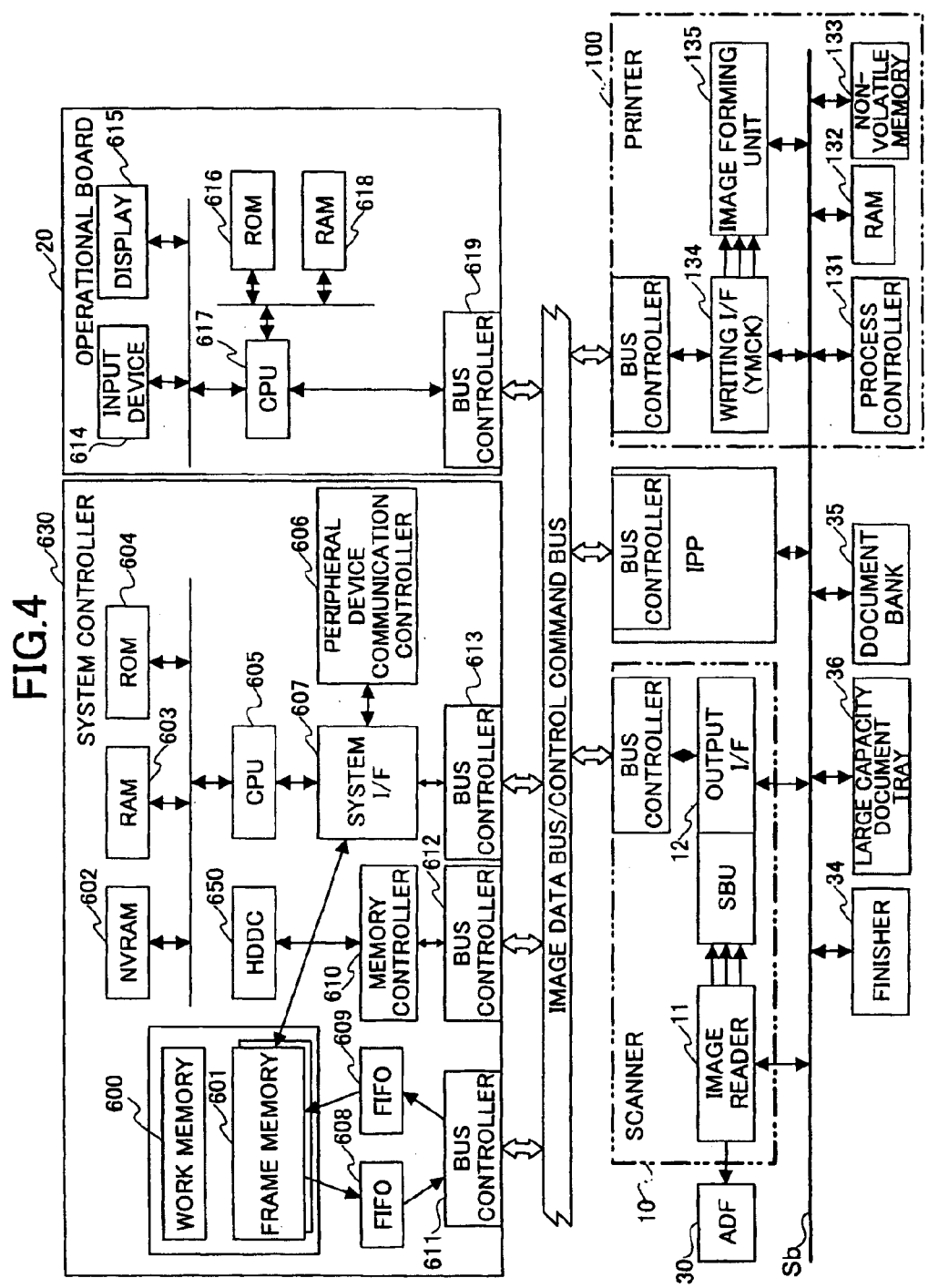
FIG. 4 is a block diagram showing a system for controlling image reading, image processing, image storage, and image formation in the multi-function full-color digital copy machine shown in FIG. 1.

FIG. 4 is a block diagram showing a system for controlling image reading, image processing, image storage, and image formation in the multi-function full-color digital copy machine shown in FIG. 1.

As shown in FIG. 4, the color scanner 10 can be divided into a number of functional sections, including a reading unit 11 having the lamp 232 for optically reading images on a document, a sensor board unit (SBU) having the CCD 207, and an output interface (I/F) 12.

The reading unit 11 moves the lamp 232 to scan the document, and the light from the lamp 232 is directed by the optical system to enter the CCD 207 of the SUB. In the SUB, the CCD 207 converts the light entering the CCD 207 into electric signals, and generates R (Red), G (Green), and B (Blue) image signals. The SUB further converts the R (Red), G (Green), and B (Blue) image signals into image data, and performs shading correction. The I/F 12 transmits the image data to an image processing processor (abbreviated as IPP, below) via the image data bus.

The IPP performs various processing, such as image separation, that is, separating text from pictures in an image, background removal, scanner γ transformation, filtering, color correction, enlargement or reduction, image processing, printer γ transformation, and grade level adjustment.

The IPP further performs correction for the image data transmitted from the color scanner 10 to reduce signal degradation occurring in the optical system and in the course of digitization of the image signals (this is the so-called scanner signal degradation), and writes the corrected data to the frame memory 601.

A system controller 630 controls the entire multi-function full-color digital copy machine shown in FIG. 1 to realize the functions of, for example, a scanner, a facsimile, a printer, and a copy machine.

The image data bus and/or control command bus is a bus for transferring the image data and command data in a time division manner.

In the system controller 630, a CPU 605 controls the entire system controller 630, a ROM 604 stores programs for control of the system controller 630, a RAM 603 is used by the CPU 605 for storing data when the CPU 605 is in operation, and a NVRAM 602, which is a non-volatile memory, stores the system data, such as the sub scan scale, and the main scan scale.

A peripheral device communication controller 606 controls communications with the peripheral devices, such as the same kind of copy machine as the multi-function full-color digital copy machine of the present embodiment, or an image scanner, a personal computer, a printer, or a facsimile, which request image reading, image storage, and image printing, for example. The peripheral device communication controller 606 performs physical I/F control for connecting itself to the network. Once the peripheral device communication controller 606 is connected to the network, it receives data through the network, and then transmits the communication data to a system I/F 607.

The system I/F 607 perform logical transformation of the received data in compliance with a prescribed protocol, and transmits the data to the CPU 605. The CPU 605 receives the data and performs various processing.

The system I/F 607 controls transfer of data read from the original document, data received by facsimile, and printing data (document data) of the personal computer, which are processed in the system under instructions of the CPU 605. The system I/F 607 also transforms the printing data of the personal computer to image data used for printing and transfers the image data.

A work memory 600 is used for image expansion (transformation of the document data to image data) for the printer. The frame memory 601 is used for temporarily storing image data to be printed immediately.

The frame memory 601 stores image data when electric power is supplied. To the contrary, a HDDC 650 includes a hard disk and the controller thereof for storing application programs, image data, and document data even if the power supply is stopped. The image data and the document data may be encoded, or in the form of dot (pixel) images.

A FIFO buffer memory 609 provides for the changing of data transfer speed when writing input image data to the frame memory 601. Specifically, the FIFO buffer memory 609 buffers the input image data so as to eliminate differences between timing of data transmission or reception, amount of data in each transfer, and the transfer speeds at a data transfer source and at a data transfer destination, and thereby, receives data at the timing and speed of the data transfer source and transmits data at the timing and speed of the data transfer destination.

Similarly, a FIFO buffer memory 608 provides for the changing of data transfer speed when transferring output image data from the frame memory 601.

A memory controller 610 controls input and output of image data between the frame memory 601 and the bus, and between HDDC 650 and the bus. In response to the commands received from an input device 614 of the operational board, the memory controller 610 utilizes the frame memory 601 to edit or process the images stored in the HDDC 650. For example, the memory controller 610 may read information of images from the hard disk in the HDDC 650 and write the information to the work memory 600 or the frame memory 601, change the direction of printing an image relative to the transfer paper by changing addresses of the image data, rotate images, combine images, change image density by arithmetic operations, trim and combine images by logical AND or logical OR operations of image data, and write image information to the HDD to modify the images.

A CPU 617 controls data input and output (that is, display output) of the operational board 20. A ROM 616 stores programs for control of the operational board 20. RAM 618 is used by the CPU 617 for storing data when the CPU 617 is in operation. The input device 614 is for users to input system setting data by stroking keys or operating a panel. A display 615 may include a screen, and is for displaying the system setting data or conditions of the system on the screen.

Figure 5:
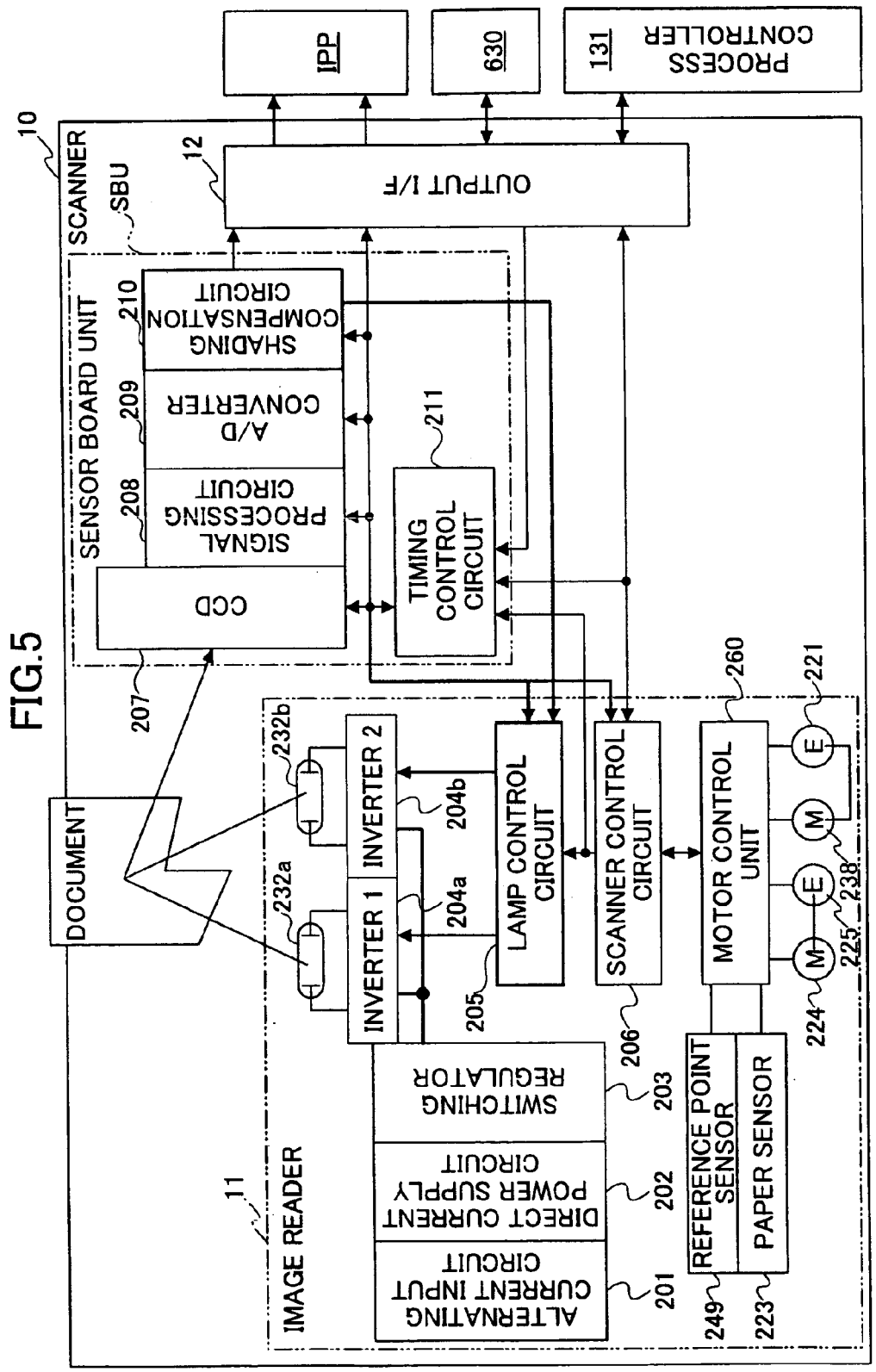
FIG. 5 is a schematic view showing a configuration of an electric system of the image reader 11 of the color scanner 10.

FIG. 5 is a schematic view showing a configuration of an electric system of the image reader 11 of the color scanner 10. As shown in FIG. 5, the analog image signal from the CCD 207 is amplified in a signal processing circuit 208. An A/D converter 209 converts the analog signal to a digital image signal. A shading correction circuit 210 performs shading correction on the digital image signal, and outputs the signal to the IPP.

A scanner control circuit 206 controls a lamp control circuit 205, a timing control circuit 211, and a motor control unit 260 in compliance with the commands from the system controller 630 and a process controller 131.

The lamp control circuit 205 controls ON/OFF of the lamp 232 (including lamps 232a and 232b) according to the commands from the scanner control circuit 206, and determines the brightness of the lamp 232 according to the illuminance specified by the shading correction circuit 210.

The motor control unit 260 controls a sub scan driving motor 238 and an ADF motor 224 according to the commands from the scanner control circuit 206. These motors are all stepping motors, and their driving (rotating) axes are connected to rotary encoders (the encoders are represented by "E" in FIG. 5) 221 and 225. The scanning position (y) and the driving length of the first carriage, the place to which documents are sent by the ADF, and the position of the back end of the first carriage are monitored by counting pulses generated by the rotary encoders 221 and 225. A paper sensor 223 in FIG. 5 detects whether a document is on the document tray 241 of the ADF 30, and may include sensors for detecting paper jam and document size.

The timing control circuit 211 generates various signals according to commands from the scanner control circuit 206, the system controller 630 (or the CPU 605 of the system controller 630), and the process controller 131. Specifically, when reading of an image is started, the timing control circuit 211 supplies a transfer gate signal for transferring data equal to one line to a shift register, and a shift clock pulse for outputting data in the shift register bit by bit to the CCD 207; and outputs a pixel synchronization clock pulse CLK, a line synchronization signal LSYNC, and a main scan effective period signal LGATE to the system controller 630. The pixel synchronization clock pulse CLK is substantially the same as the shift clock pulse supplied to the CCD 207. The line synchronization signal LSYNC corresponds to a line synchronization MSYNC output by a beam sensor in an image forming unit 135 of the printer 100, but output of the line synchronization signal LSYNC is prevented during the operation of reading an image. The main scan effective period signal LGATE is at a high level at a timing when the image signal output by the CCD 207 is determined to be effective.

When a command to start reading an image is received from a process controller 131, the scanner control circuit 206 controls the timing control circuit 211 to start operation of the CCD 207, turn on the lamp 232, and start to drive the sub scan driving motor 238 in the case of the manual document feeding mode or the ADF motor 224 in the case of the ADF mode. In addition, the scanner control circuit 206 sets the sub scan effective period signal FGATE to the high level, indicating the current position is outside the region of the document. In the manual document feeding mode, when the first carriage moves to the position at the front end of the document, the sub scan effective period signal FGATE is switched to a low level, indicating the current position is within the region of the document. In the ADF mode, when the portion of the document conveyed out of the resist rollers reaches a home position (HP) (see FIG. 3), which is the position of reading the document in the ADF mode, the sub scan effective period signal FGATE is switched to the low level, indicating the current position is within the region of the document. The length of the portion of the document fed out of the resist rollers is calculated from the difference between the feeding length Df from the resist rollers 243 to the reference point sensor 249 and the feeding length a from the HP to the reference point sensor 249.

Figure 6:
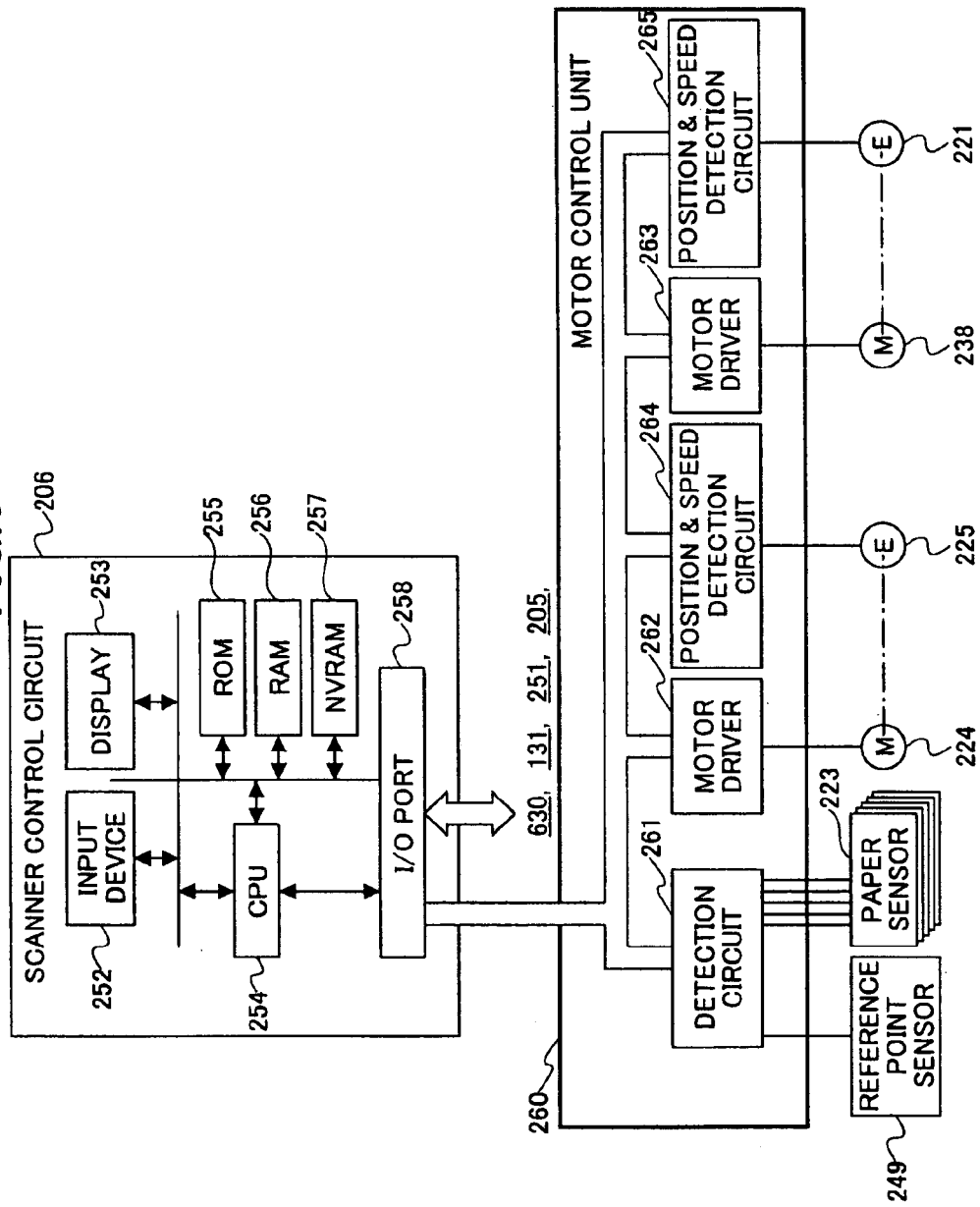
FIG. 6 is a block diagram showing configurations of the scanner control circuit 206 and the motor control unit 260.

FIG. 6 is a block diagram showing configurations of the scanner control circuit 206 and the motor control unit 260.

In FIG. 6, a CPU 254 controls input and output of the scanner control circuit 206, and the driving operations of the sub scan driving motor 238 and the ADF motor 224. Specifically, the CPU 254 controls input (reading) and output (displaying) operations at the operational board 20 of the scanner 10, and drives the carriages and the ADF 30 in response to the document reading command from the system controller 630 and the process controller 131. A ROM 255 stores programs for control of the scanner control circuit 206. A RAM 256 is used by the CPU 254 for storing data when the CPU 254 is in operation. An input device 252 is for users to input system setting data by stroking keys or operating a panel of the operational board 20 of the scanner 10. A display 253 of the operational board 20 of the scanner 10 may include a screen, and is for displaying the system setting data or conditions of the system on the screen.

Figure 7:
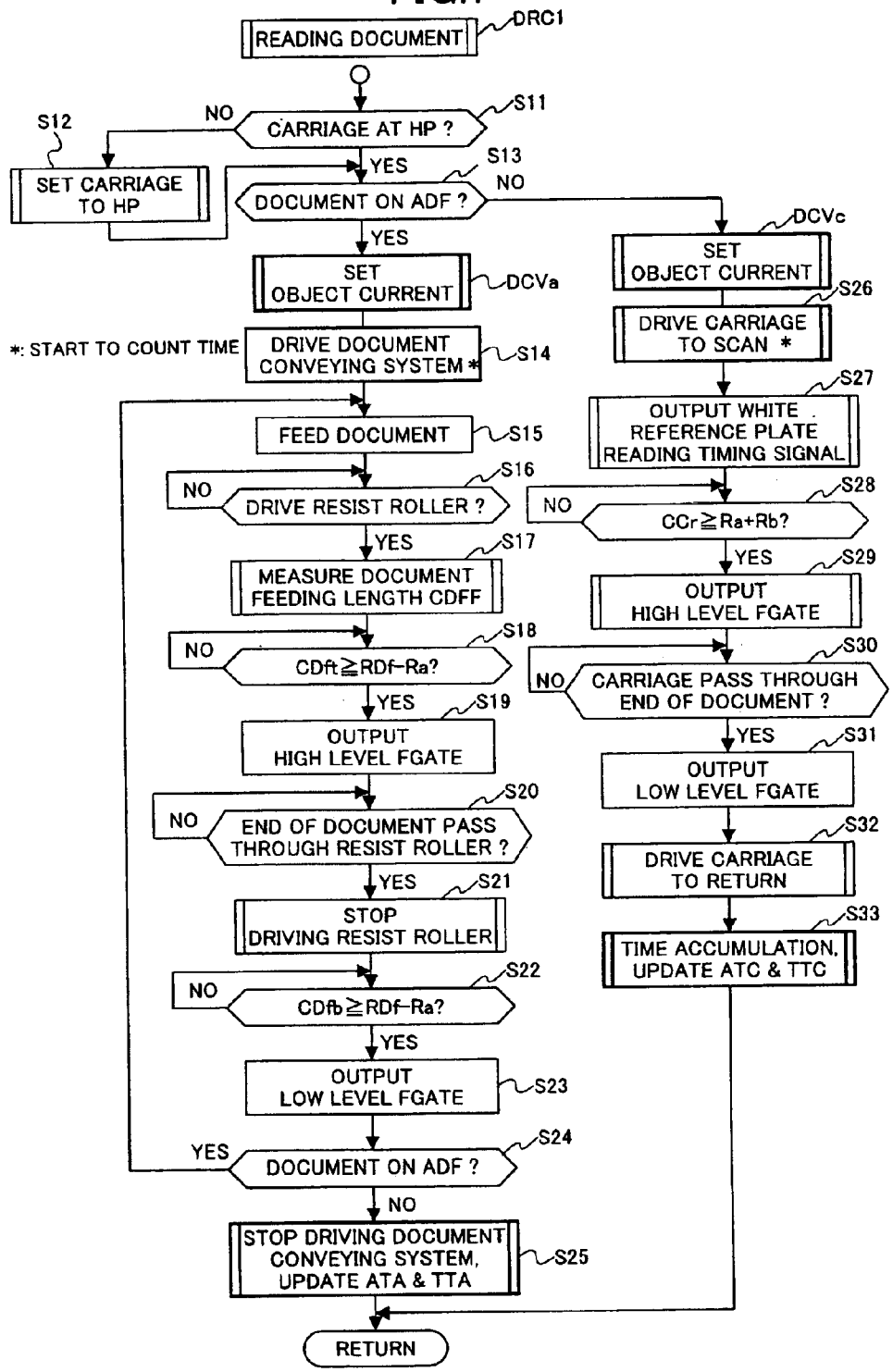
FIG. 7 is a flow chart showing the operations of controlling reading of a document executed by the CPU 254 of the scanner control circuit 206 in the first embodiment.

FIG. 7 is a flow chart showing the operations executed by the CPU 254 of the scanner control circuit 206 for controlling image reading in response to the command to start reading an image (reading start command) from the system controller 630 and the process controller 131.

In step S11, when receiving the reading start command, the CPU 254 sends a signal to the lamp control circuit 205 to turn on the lamp 232. Then, the CPU 254 determines whether the first carriage is at the home position.

In step S12, if the sub scan position data of the first carriage does not indicate the home position, the CPU 254 drives the first carriage to move along the sub scan driving direction (the right side of the Y direction in FIG. 3). When the reference point sensor 249 detects the first carriage, the CPU 254 stops the first carriage, and drives the first carriage to return. At the time when the carriage is out of detection range of the reference point sensor 249, the sub scan position data are initialized to a value indicating the reference position of the hardware. Then, with the sub scan position data, the first carriage is set at the home position.

When driving the first carriage along the forward driving direction (the sub scan direction), the sub scan position data value is incremented by one each time the rotary encoder generates a pulse. In contrast, when driving the first carriage along the return direction, the sub scan position data value is decremented by one each time the rotary encoder generates a pulse. Therefore, the sub scan position data value is updated according to the actual position of the first carriage.

In step S13, when the first carriage is moved to the home position, the CPU 254 determines whether the paper sensor 223 of the ADF 30 detects a document on the document tray 241. Because the paper sensor 223 is attached to the ADF 30, when there are no documents on the document tray 241, or the ADF is not mounted, the paper sensor 223 does not detect a document, and the CPU 254 proceeds to operations in step S26. Otherwise, the CPU 254 executes operations in step S14.

In step S14, if the paper sensor 223 of the ADF 30 detects the presence of a document, the CPU 254 executes the operation of setting the object current (DCVa), and starts to drive the document conveying system including the conveying drum 244 of the ADF 30, and to count the elapsed time.

In step S15, the CPU 254 drives the pickup roller 242 to feed the documents stacked on the document tray 241 from the top.

In step S16 and step 17, the front end of the fed document contacts the resist rollers 243 and its moving speed is slowed. Then the CPU 254 starts to drive the resist rollers 243 to feed the document, and starts to measure the document feeding length CDff, which indicates the position of the front end of the document.

In step S18 and step 19, when the document feeding length CDff becomes greater than or equal to RDf−Ra, in which RDf and Ra are data in a document moving length register and the HP register of the RAM 256, respectively, and the value of RDf−Ra indicates the position HP, the CPU 254 switches the sub scan synchronization signal FGATE from the high level, indicating that the current position is out of the region of the document, to the low level, indicating that the current position is within the region of the document.

In step S20 and step 21, when the back end of the document passes through the resist rollers 243, the CPU 254 starts to measure the back end feeding length CDfb, and stops driving the resist rollers 243.

In step S22 and step 23, when the back end feeding length CDfb becomes greater than or equal to RDf−Ra, in which the RDf and Ra are data in a document moving length register and the HP register of the RAM 256, respectively, and the value of RDf−Ra indicates the position HP, the CPU 254 switches the sub scan synchronization signal FGATE from the low level to the high level, indicating that the current position is out of the region of the document.

In step S24, when the paper sensor 223 detects the next document, the routine goes back to step S15 to feed the next document.

In step S25, if the paper sensor 223 does not detect the next document, the CPU 254 stops the document conveying system including the conveying drum 244 from conveying the document, and the CPU 254 adds the elapsed time so far, that is, the operation time of the stepping motor 224 in the current operation, to the data in the accumulation registers ATa and Tta of a non-volatile memory (NVRAM) 257, and writes the resultant sum to the accumulation registers ATa and Tta to update data therein.

In step S26, because the paper sensor 223 does not detect documents in step S13, the CPU 254 executes the operation of setting the object current (DCVc), starts to drive the carriages to scan, counts the elapsed time, and starts to measure the distance through which the carriages move relative to the home position (referred to as scanning driving length CCr below). Details of the operation of setting the object current (DCVc) are described with reference to FIG. 8.

In step S27, if the value of the scanning driving length CCr equals a value indicative of the front end of the white reference plate 239, the CPU 254 switches a white reference plate reading timing signal, which is supplied to the shading correction circuit 210, from the high level (indicating that the current position is out of the range of the white reference plate) to the low level (indicating that the current position is within the white reference plate range). If the value of the scanning driving length CCr equals a value indicative of the back end of the white reference plate 239, the CPU 254 switches the white reference plate reading timing signal from the low level to the high level.

In step S28, the CPU 254 waits for the scanning driving length CCr to become a value greater than or equal to the sum of the data Ra and Rb in a HP register and document front end register of the RAM 256, respectively.

In step S29, if the value of the scanning driving length CCr becomes Ra+Rb, the CPU 254 switches a sub scan synchronization signal FGATE, which is supplied to the timing control circuit 211, from the high level, indicating that the current position is out of the document region, to the low level, indicating that the current position is within the document region.

The sub scan synchronization signal FGATE, and other signals generated in synchronization with the sub scan synchronization signal FGATE, are also output to the IPP, the system controller 630, and the process controller 131 from the color scanner 10.

In step S30 and step S31, as in the case of reading the document on the contact glass in the related art, when the first carriage passes through the position of the back end of the document, the CPU 254 sets the sub scan synchronization signal FGATE back to the high level (indicating the current position is out of the document region) to stop driving the carriage.

In step S32, the CPU 254 moves the carriage back quickly. When the reference point sensor 249 detects the carriage, the CPU 254 slows and controls the return speed of the carriage and, after the carriage is out of detection range of the reference point sensor 249, the CPU 254 stops the first carriage after the first carriage returns by a distance "a" (that is, at the position HP). The distance "a" is the value of the data Ra stored in the HP register Ra.

In step S33, the CPU 254 adds the elapsed time so far, that is, the operation time of the stepping motor 238 in the current operation, to the data in the accumulation registers Atc and Ttc of the non-volatile memory (NVRAM) 257, and writes the resulting sum to the accumulation registers Atc and Ttc to update data therein.

Figure 8:
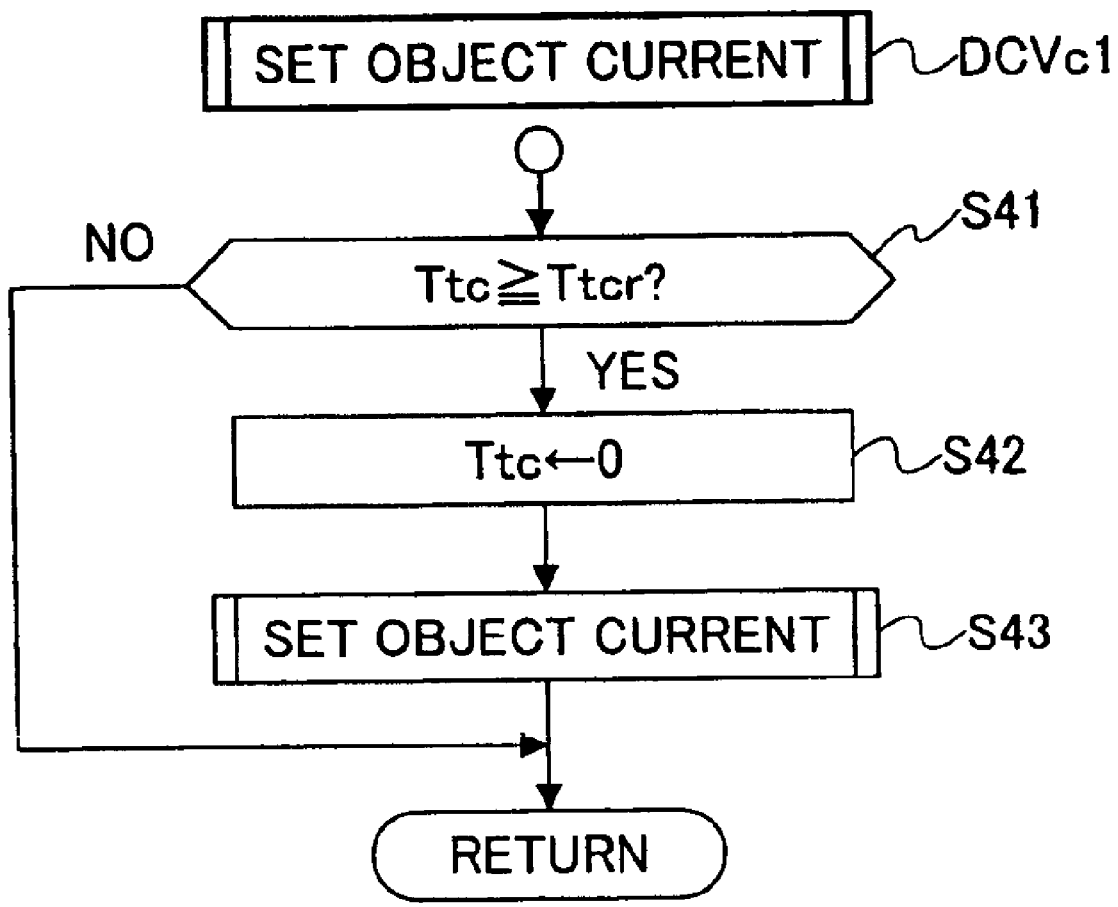
FIG. 8 is a flow chart showing the operation of setting the object current (DCVc) executed by the CPU 254 of the scanner control circuit 206 in the first embodiment.

FIG. 8 is a flow chart showing the operation of setting the object current (DCVc).

In step S41, the CPU 254 determines whether the cumulative operation time indicated by the data in the accumulation register Ttc is greater than or equal to a specified value Ttcr.

In step S42, if the cumulative operation time (also denoted as Ttc) is greater than or equal to the specified value Ttcr, indicating that the present object current setting should be updated, the CPU 254 initializes the data in the accumulation registers Ttc to a value equivalent to 0 in order to determine the timing of the next update of the object current.

In step S43, from the non-volatile memory (NVRAM) 257, the CPU 254 reads out the object current data for forward driving Cfr and the object current data for return driving Crr corresponding to the cumulative operation time (or at the corresponding address closest to the cumulative operation time) indicated by the data in the accumulation registers Atc, and sets the object currents of the motor driver 263.

In the forward driving operations as described in steps S27 through S31, the motor driver 263 provides an excitation current equivalent to the object current Cfr to the stepping motor 238. Similarly, in the return driving operations as described in step S32, the motor driver 263 provides an excitation current equivalent to the object current Crr to the stepping motor 238.

Figure 9A:
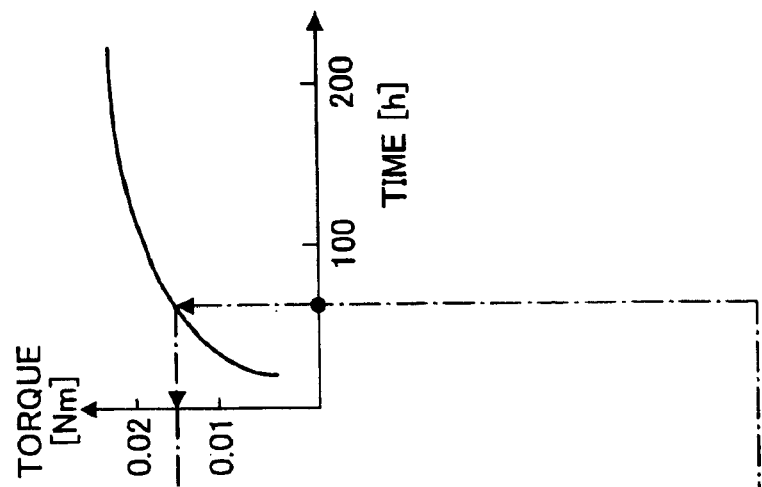
Figure 9B:
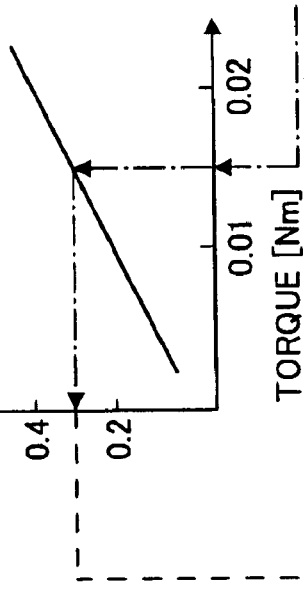
Figure 9C:
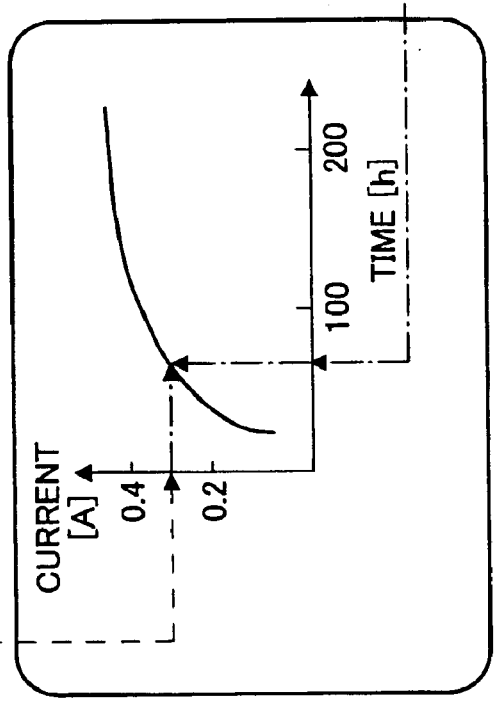

Next, explanations are made of the object currents Cfr and Crr stored in the NVRAM 257 with reference to FIGS. 9A through 9C.

FIGS. 9A through 9C are graphs showing methods of determining the required object currents Cfr and Crr from data stored in the non-volatile memory 257, in which: FIG. 9A is a graph showing the time dependence of the required load torque of the stepping motor 238; FIG. 9B is a graph showing the relation between the excitation current and the resultant torque of the stepping motor 238; and FIG. 9C is a graph showing the dependence of the required object current on the cumulative operation time obtained from graphs in FIG. 9A and FIG. 9B.

For example, the color scanner 10 is repeatedly used for testing, and the cumulative operation time (driving time) is measured. For example, the test of the color scanner 10 lasts for ten hours each time, and in each test, the load torques in forward driving and return driving of the color scanner 10 are measured to obtain the data for creating the graphs of the load torque versus the cumulative operation time as shown in FIG. 9A in the forward driving case and in the return driving case, respectively.

Then, for example, each time the cumulative operation time reaches one hour, the required torque corresponding to the current cumulative operation time is extracted from the relation between the load torque versus the cumulative operation time shown in FIG. 9A. In addition, utilizing the relation between the excitation current and the resultant torque of the stepping motor 238 as shown in FIG. 9B, the extracted required torque is transformed to a current, and an object current is obtained by adding a safety margin to the transformed current. In this way, the relation between the required object current and the cumulative operation time as shown by the graph in FIG. 9C is obtained. Two graphs are obtained for the case of forward driving and return driving, respectively.

The time dependence of the required object current on the cumulative operation time is stored in the NVRAM 257 in a form of a data table, and it is referred to as an object current table. In this table, the object current data, including the forward driving object current Cfr and the return driving object current Crr, are written with the corresponding cumulative operation time data as the read or write addresses.

Therefore, in the object current table stored in the NVRAM 257, each of the forward driving object current Cfr and the return driving object current Crr is stored as a function of the cumulative operation time in steps of one hour.

As a result, in the operation of setting the object current (DCVc) shown in FIG. 7, each time the cumulative operation time Ttc from the time of the preceding update of the object current is greater than Ttcr (it is one hour here), the CPU 254 reads out the object currents Cfr and Crr corresponding to the cumulative operation time (or at a corresponding address closest to the cumulative operation time Ttc) counted from the time of starting the operation of the stepping motor 238 from the non-volatile memory (NVRAM) 257, and sets the object currents of the motor driver 263.

In the operations of setting the object currents (DCVa in step S14 in FIG. 7) for the stepping motor 244 in the ADF 30, which is used for driving feeding of documents, the procedure is similar to that of the stepping motor 238 described above, except that the document feeding driving is performed in a single direction. Therefore, in the period when the document passes through the glass 240 (refer to FIG. 3), where the document is read, the document is fed at a low speed, an at time outside of this period, the document is fed at a high speed, hence, a first object current used for the low speed case and a second object current used for the high speed case are necessary for each cumulative operation time. The motor driver 262 provides an excitation current equivalent to the second object current to the stepping motor 224 until the front end of the document reaches the glass 240, an excitation current equivalent to the first object current to the stepping motor 224 when the document is above the glass 240, and an excitation current equivalent to the second object current to the stepping motor 224 after the document leaves the glass 240.

In the image forming apparatus shown in FIG. 2, as mentioned above, the stepping motor (color drum motor) for driving the photo-conducting drums 111M, 111C, and 111Y to revolve, the stepping motor (black drum motor) for driving the photo-conducting drum 111K and the transfer conveying belt, and the motor control unit for controlling the stepping motor driving the resist rollers 105 and the developing units 120M, 120C and 120Y are not illustrated, but the motor control unit has the configuration and functions similar to the motor control unit 260 and the scanner control circuit 206. The motor control unit determines the object currents of the above stepping motors and provides excitation currents equivalent to the object currents to these stepping motors.

Second Embodiment

This embodiment basically relates to the same multi-function full-color digital copy machine as described in the first embodiment, with the primary differences being described below. In the operation of reading documents (denoted as DRC1 in the first embodiment) executed by the CPU 254 of the scanner control circuit 206 in the color scanner 10, the operations of setting the object currents, denoted as DCVa and DCVc in the first embodiment, are modified in the present embodiment; in the steps S33 and S25, operation of updating Tta is the same in both the first embodiment and the present embodiment, but operation of updating ATc is omitted in the present embodiment. This modified operation of reading documents is denoted as DRC2 in the present embodiment to be distinguished from DRC1 in the first embodiment, but it is not explicitly illustrated in the figures. Further, in the present embodiment, there is not an object current table in the NVRAM 257, but there are object current registers Cfr and Crr; further, while the accumulation register Ttc is present in the non-volatile memory (NVRAM) 257 as in the first embodiment, the accumulation register Atc appearing in the first embodiment does not exist in the present embodiment.

Figure 10:
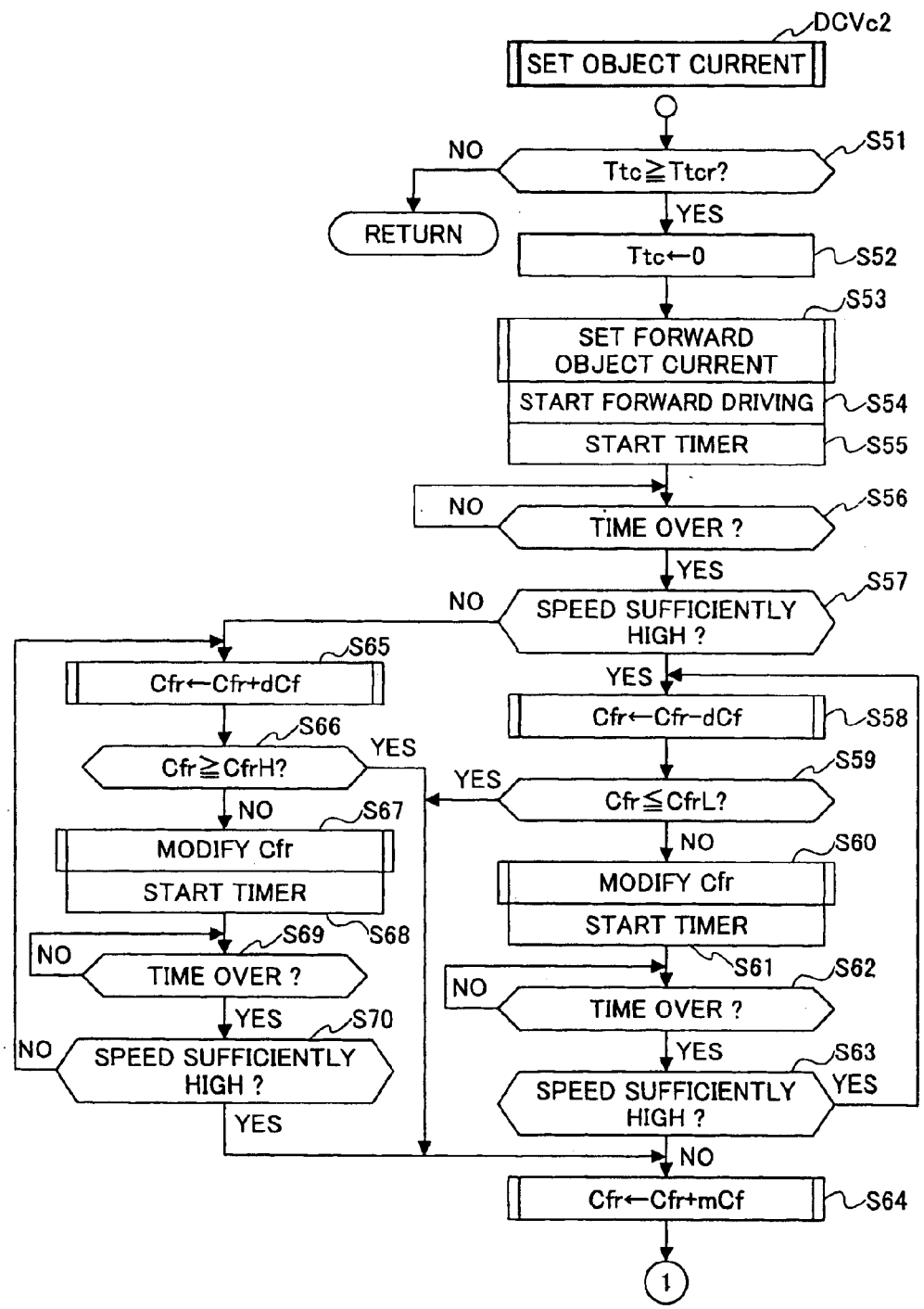
FIG. 10 is a flow chart showing the operation of setting the object current (DCVc2) executed by the CPU 254 of the scanner control circuit 206 in the second embodiment.

FIG. 10 is a flow chart showing the operation of setting the object current (denoted as DCVc2) in the operation of reading documents (DRC2) in the second embodiment, as a replacement of DCVc in the first embodiment. In the following, only some of the steps in FIG. 10 are described.

As shown in FIG. 10, the CPU 254 determines whether the data value in the accumulation register Ttc is greater than or equal to a specified value Ttcr (for example, one hour) (step S51).

If the cumulative operation time (also denoted as Ttc) is greater than or equal to the specified value Ttcr, indicating that the present object current setting should be updated, the CPU 254 initializes the data in the accumulation registers Ttc to a value equivalent to 0 in order to determine the next timing of updating the object current (step S52).

From the non-volatile memory (NVRAM) 257, the CPU 254 reads out the forward driving object current Cfr from the object current register Cfr, sets the forward driving object current of the motor driver 263, and starts the forward driving operation (step S53 and step S54).

After a time period Tw from the start of the forward driving, if the rotating speed of the stepping motor 238 becomes a specified value (document reading scanning speed) or higher, the CPU 254 lowers the object current incrementally to find a critical current that causes out-of-step (steps S58 through S63). In this operation, if the object current is reduced to a value smaller than a lower limit (CfrL), the lower limit is regarded as the critical current (steps S59 through S64).

Then, a safety margin (mCf) is added to the critical current, and the resulting value is used to update the data in the object current registers Cfr (step S71).

If the rotating speed of the stepping motor 238 is lower than the specified value after the time period Tw from the start of the forward driving, which indicates occurrence of out-of-step, the CPU 254 increases the object current in increments to find a critical current of recovery from the out-of-step state to an in-step state (steps S65 through S70). In this operation, if the object current is increased to a value larger than an upper limit (CfrH), the upper limit is regarded as the critical current (steps S64 through S66).

Then, the safety margin is added to the critical current, and the resultant value is used to update the data in the object current registers Cfr (step S71).

Figure 11:
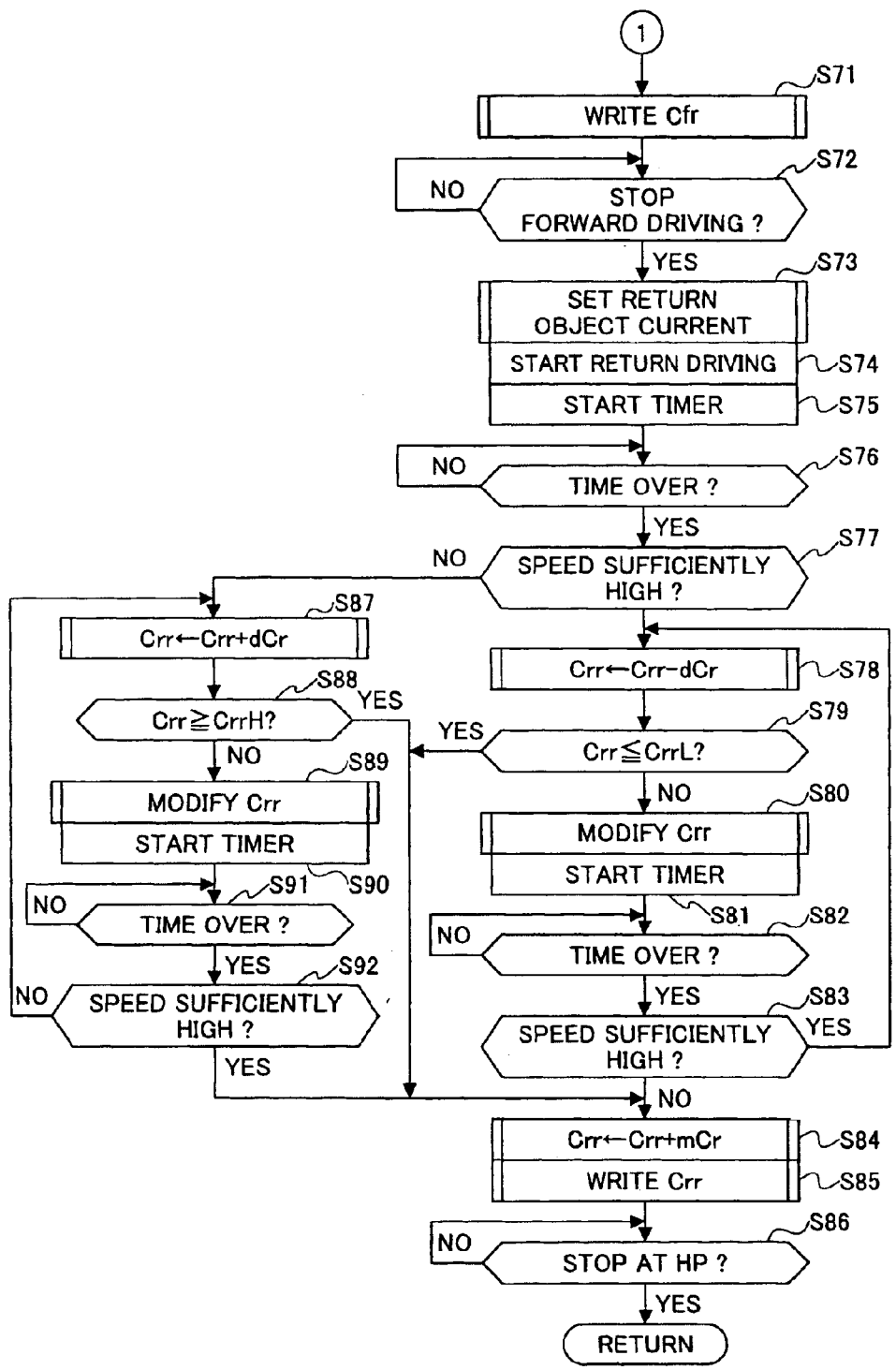
FIG. 11 is a flow chart showing the operations subsequent to those in FIG. 10, primarily related to return driving.

FIG. 11 is a flow chart showing the operations subsequent to those in FIG. 10, primarily related to return driving. In the following, only some of the steps in FIG. 11 are described.

As shown in FIG. 11, at the end point of forward driving, the CPU 254 stops the forward driving (step S72), sets the return driving object current of the motor driver 263 to be equal to the data in the object current register Crr, and starts the return driving operation (step S73 and step S74).

After a time period Tw from the start of return driving, if the rotating speed of the stepping motor 238 becomes the specified value (document reading scanning speed) or higher, the CPU 254 lowers the object current in increments to find a critical current of out-of-step (steps S78 through S83).

In this operation, if the object current is reduced to a value smaller than a lower limit (CrrL), the lower limit is regarded as the critical current (steps S79 through S84).

Then, a safety margin (mCr) is added to the critical current, and the resultant value is used to update the data in the object current register Crr (step S85).

If the rotating speed of the stepping motor 238 is lower than the specified value after the time period Tw from the start of the forward driving, which indicates out-of-step, the CPU 254 increases the object current in increments to find a critical current of recovery from the out-of-step state to the in-step state (steps S87 through S92). In this operation, if the object current is increased to a value greater than an upper limit (CrrH), the upper limit is regarded as the critical current (steps S84 through S86).

Then, the safety margin is added to the critical current, and the resultant value is used to update the data in the object current register Cfr (step S71).

Subsequently, the carriage is stopped at the home position (step S86).

In the second embodiment, each time the cumulative operation time Ttc becomes the specified value Ttcr or higher, the out-of-step detection is initiated automatically to find the out-of-step critical current. This critical current, with a safety margin added, is set as the new object current. In this way, the object current is automatically updated in response to the time variation of the load torque.

Third Embodiment

The present embodiment basically relates to the same multi-function full-color digital copy machine as described in the first embodiment, with the primary differences being described below.

Figure 12:
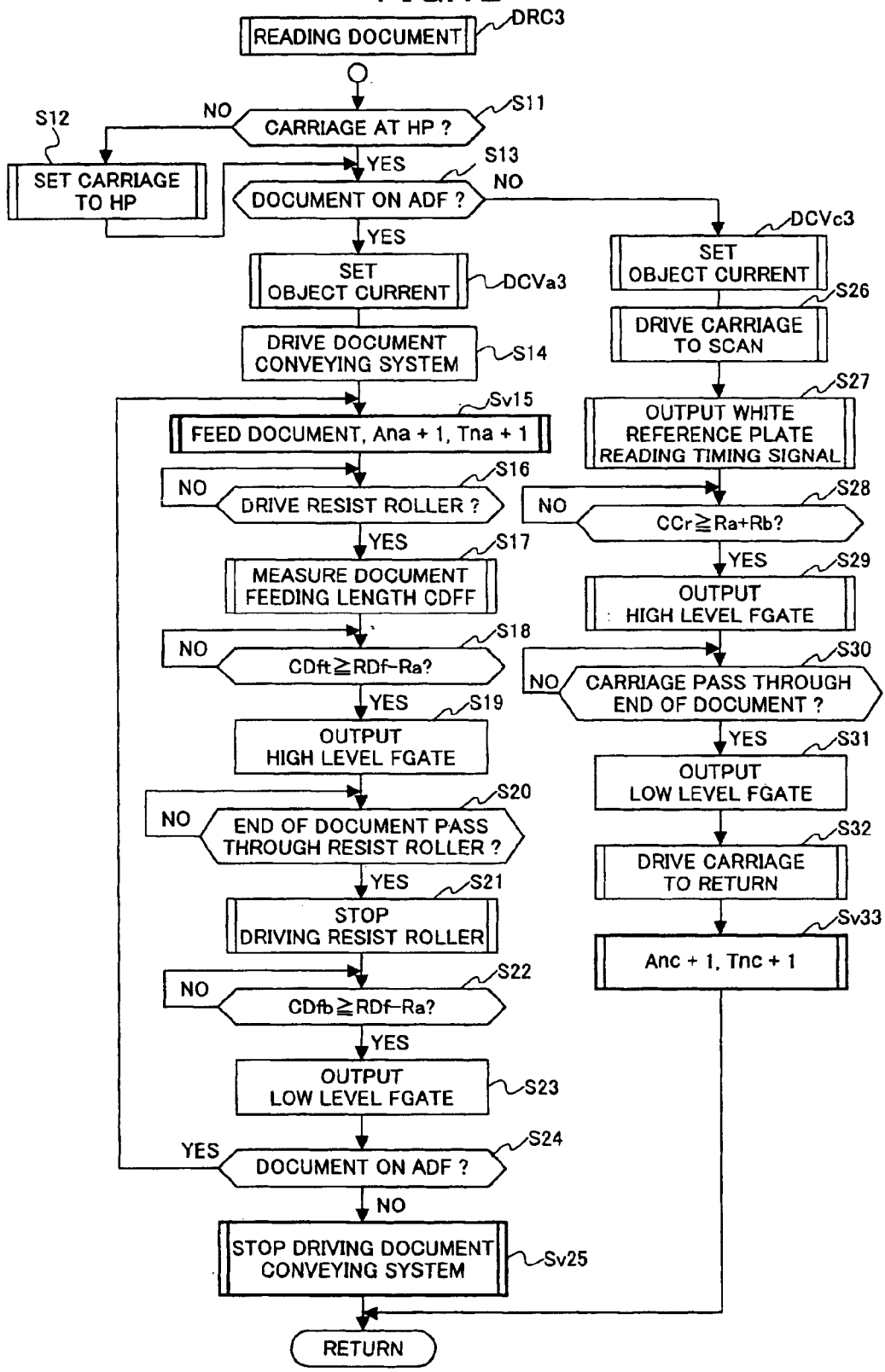
FIG. 12 is a flow chart showing the operation of reading documents (DRC3) executed by the CPU 254 of the scanner control circuit 206 in the third embodiment.

The operation of reading documents (denoted as DRC1 in the first embodiment) executed by the CPU 254 of the scanner control circuit 206 in the color scanner 10 is modified to be DRC3 in the present embodiment, as shown in FIG. 12. Further, in the present embodiment, the object current table in the NVRAM 257 stores the object current values in the order of number of uses (one use means reading one sheet of a document), but not of the cumulative operation time.

FIG. 12 is a flow chart showing the operation of reading documents (denoted as DRC3) in the third embodiment. Below, the flow chart in FIG. 12 is described only briefly.

In the operation of reading documents (DRC3), instead of counting the elapsed time, when reading the document on the ADF 30, each time one sheet of a document is fed, each of the cumulative number of times in the accumulation registers Ana and Tna of the NVRAM 257 is incremented by one. This is the step Sv15 in FIG. 12. In addition, when scanning a document on the contact glass 231, each time the carriage moves forward and backward once (one cycle), each of the cumulative number of times in the accumulation registers Ana and Tna of the NVRAM 257 is incremented by one. This is the step Sv33 in FIG. 12.

Figure 13:
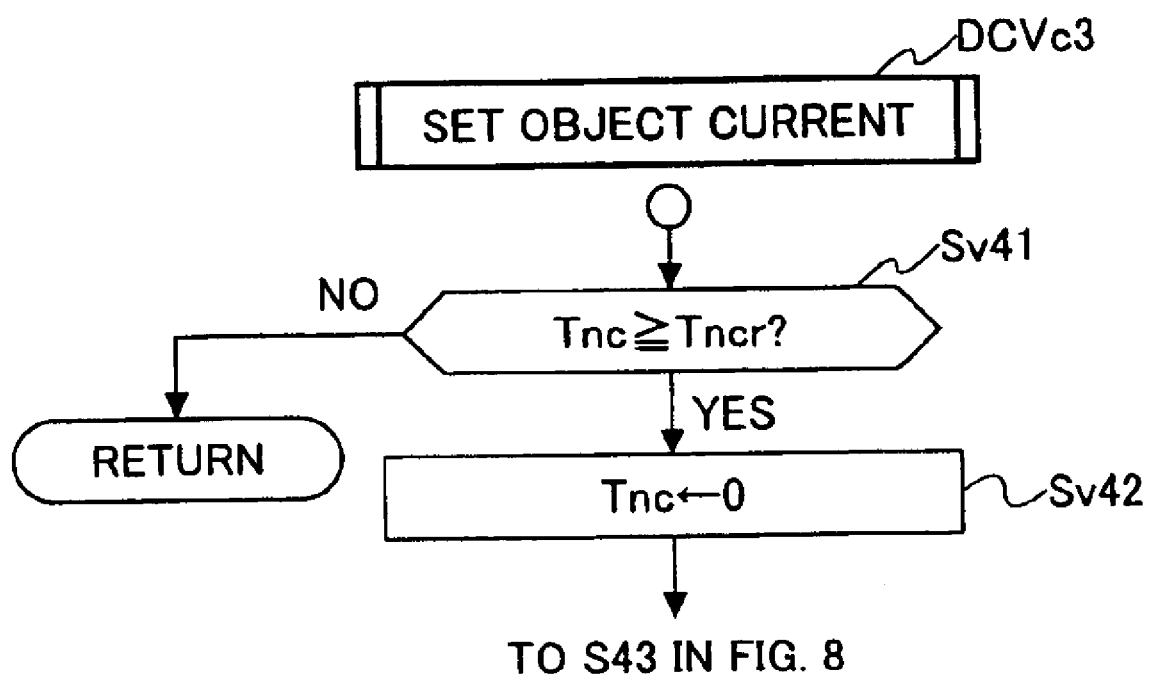
FIG. 13 is a flow chart showing the operation of setting the object current (DCVc3) executed by the CPU 254 of the scanner control circuit 206 in the third embodiment.

In connection with the above operations, in the operation of setting the object current, denoted as DCVc3, as shown in FIG. 13, if the data value in the accumulation register Tnc is greater than or equal to a specified value Tncr (number of times of scanning, corresponding to one hour of the cumulative operation time in the first embodiment), the object current value Cfr is updated, as done in step S43 and the subsequent steps, provided that Ttc in FIG. 8 is replaced by Tnc.

The operation DCVa3 is modified in the same way as DCVc3.

Fourth Embodiment

The present embodiment basically relates to the same multi-function full-color digital copy machine as described in the first embodiment, with the primary differences being described below.

Figure 14:
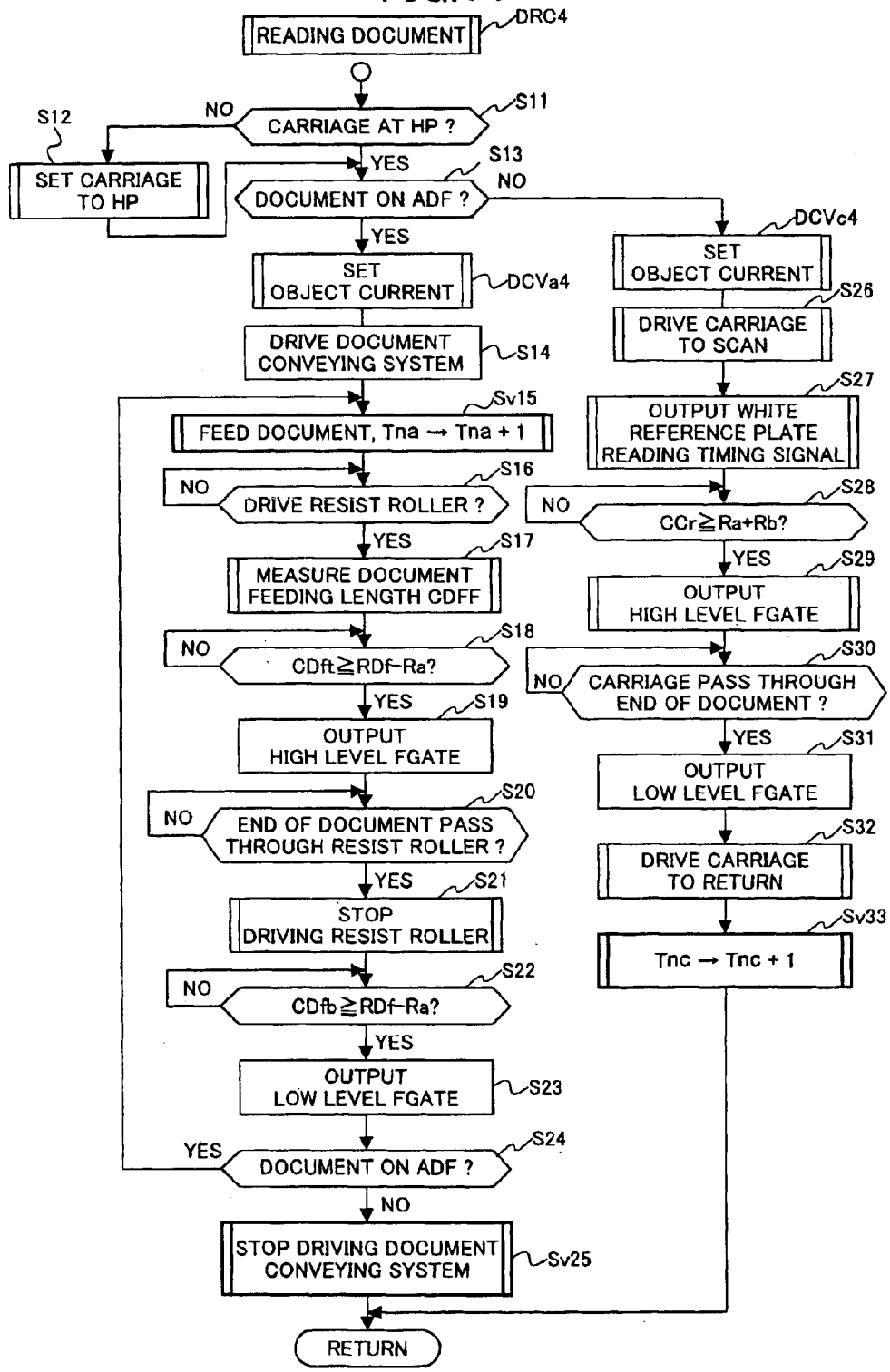
FIG. 14 is a flow chart showing the operation of reading documents (DRC4) (Note.

The operation of reading documents (denoted as DRC1 in the first embodiment) executed by the CPU 254 of the scanner control circuit 206 in the color scanner 10 is modified to be DRC4 in the present embodiment, as shown in FIG. 14. Further, in the present embodiment, as in the second embodiment, there is not an object current table in the NVRAM 257, but object current registers Cfr and Crr. Further, in the present embodiment, the accumulation register Ttc in the first or the second embodiments is replaced by an accumulation register Tnc in the NVRAM 257, which is an accumulation register for storing number of times of reading documents, and there is not the accumulation register Atc as in the first embodiment.

FIG. 14 is a flow chart showing the operation of reading documents (denoted as DRC4) in the fourth embodiment. Below, the flow chart in FIG. 14 is described only briefly.

In the operation of reading documents (DRC4) in the present embodiment, instead of counting the elapsed time, when reading the document on the ADF 30, each time one sheet of a document is fed, the cumulative number of times in the accumulation register Tna of the NVRAM 257 is incremented by one. This is the step Sv15 in FIG. 14. In addition, when scanning a document on the contact glass 231, each time the carriage moves forward and backward once, the cumulative number of times in the accumulation register Tna of the NVRAM 257 is incremented by one. This is the step Sv33 in FIG. 14.

Figure 15:
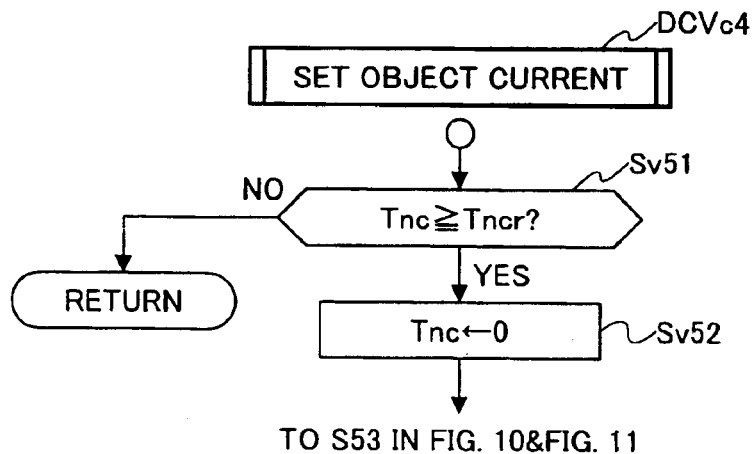
FIG. 15 is a flow chart showing the operation of setting the object current (DCVc4) executed by the CPU 254 of the scanner control circuit 206 in the fourth embodiment.

In connection with the above operations, in the operation of setting the object current, denoted as DCVc4, as shown in FIG. 15, if the data value in the accumulation register Tnc is greater than or equal to a specified value Tncr (number of times of scanning, corresponding to one hour of the cumulative operation time in the first embodiment), the object current value Cfr is updated, as done in step S53 and the subsequent steps.

The operation DCVa4 is modified in the same way as DCVc4.

Fifth Embodiment

In the first embodiment described above, the dependence of the required object current on the cumulative operation time, as shown by the graph in FIG. 9C, is obtained from the time dependence of the load torque as shown by the graph in FIG. 9A, and the relation between the excitation current and the resultant torque as shown by the graph in FIG. 9B, and the obtained required object current data are stored in the order of the cumulative operation time in the object current table in the NVRAM 257.

As a modification to the first embodiment, for example, the color scanner 10 is repeatedly used for testing, and the cumulative operation time (driving time) is measured. For example, the color scanner 10 is tested for ten hours each time, and in each test, for the case of forward driving and the case of return driving of the color scanner 10, out-of-step detection is performed to find an out-of-step critical current. The out-of-step detection may be the same as those described below with reference to FIG. 10, specifically, in step S54 through S70; and with reference to FIG. 11, specifically, in step S74 through S92. The out-of-step critical current is defined to be the excitation current at which the present in-step state transitions to an out-of-step state, or vice versa, when the value of the excitation current is changed in increments. Further, in each test, the out-of-step critical current can be measured at a number of cumulative operation time, thereby obtaining the dependence of the out-of-step critical current on the cumulative operation times. Based on this result, and by means of interpolation, values of the out-of-step critical currents as a function of the cumulative operation time in steps of one hour can be obtained. The required object currents can be obtained by adding a safety margin to the above out-of-step critical current values. These required object currents may be stored in the object current table in the NVRAM 257. Other settings and controls may be the same as those in the first embodiment.

Sixth Embodiment

In the first through fourth embodiments described above, it is possible to provide an additional function of monitoring out-of-step during, operation of a stepping motor.

For example, when the carriages start moving, the CPU 254 of the scanner control circuit 206 in the color scanner 10 starts a timer for initiating the interrupt. This timer is referred to as "interrupt timer" below. The CPU 254 permits timer interrupt, and at the same time, the CPU 254 also permits pulse interrupt, in which in response to encoder pulses generated by the rotary encoder 221, the number of the input encoder pulses is counted.

Subsequently, when the CPU 254 switches the control of the stepping motor corresponding to a stage in which the speed of the carriage rises to the control corresponding to a constant speed stage, the CPU 254 writes "1" (indicating the constant speed stage) to the register FRO, which is an inner memory of the CPU 254. When the constant speed stage is over, the CPU 254 writes "0" to the register FRO.

Figure 16:
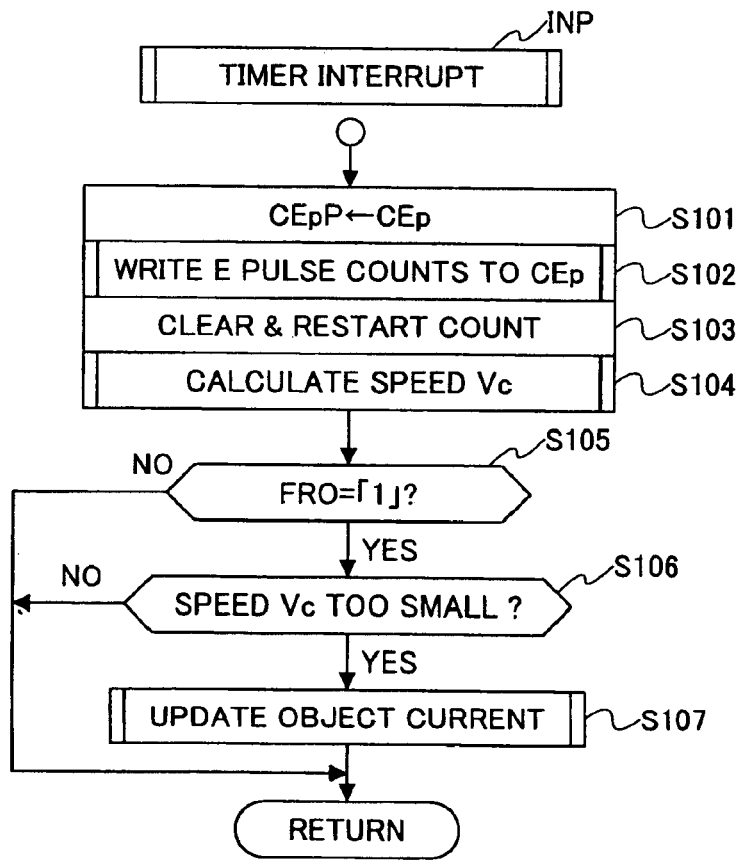
FIG. 16 is a flow chart showing the operations of the timer interrupt in the sixth embodiment.

FIG. 16 is a flow chart showing the operations of the timer interrupt in the sixth embodiment.

In step S101, when the interrupt timer reaches time-over, the CPU 254 restarts the interrupt timer, and writes the preceding encoder pulse count from the present value register CEp (an inner memory of the CPU 254) to the preceding value register CEpP.

In step S102, the CPU 254 writes the rotary pulse count obtained by means of pulse interrupt to the present value register CEp.

In step S103, the CPU 254 clears the count register that is counting the rotary pulses, and restarts counting the rotary pulses.

In step S104, the CPU 254 calculates the rotating speed Vc of the stepping motor 238 (carriage driving speed) according to the data in the preceding value register CEpP, the data in the present value register CEp, and limit value of the interrupt timer.

In step S105, the CPU 254 determines whether the data value in the register FRO is "1".

In step S106, when the data value in the register FRO is "1", the CPU 254 determines whether the speed Vc is lower than a specified speed.

In step S107, when the speed Vc is lower than the specified speed, the object current is updated, and the present object value setting of the motor driver 263 is updated.

Consequently, when out-of-step occurs, the stepping motor 238 can rapidly increase the excitation current.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effects of the present invention, according to the present invention, in a system including a stepping motor and load machinery that is coupled to and driven by the stepping motor, when the load changes in the course of the operation of the stepping motor, load torques of the system corresponding to different amounts of operation of the stepping motor can be measured or predicted by calculations, for example, by using an identical testing stepping motor. The amount of operation of the stepping motor, for example, may be the cumulative operation time, or the cumulative number of times of operation. Based on a relation between the driving current flowing in the stepping motor and the resulting generated torque of the stepping motor, it is possible to calculate a driving current for generating a required torque. For example, the required torque is obtained by adding a safety margin to the calculated torque. The required driving currents obtained in this way are stored in the storage unit in conjunction with the amounts of operation, respectively. As a result, in the course of actual operation of the stepping motor, a sufficiently large driving current can be supplied to the stepping motor automatically, making it possible to reduce power consumption.

This patent application is based on Japanese Priority Patent Application No. 2002-262039 filed on Sep. 6, 2002, the entire contents of which are hereby incorporated by reference.

What is claimed is:

1. A stepping motor controller for setting a driving current of a stepping motor, comprising:
   a storage unit configured to store a plurality of object values of the driving current;
   an accumulation unit configured to accumulate an amount of operation of the stepping motor; and
   a driving current setting unit configured to read out one of the object values corresponding to the amount of operation from the storage unit and to set the driving current to the one of the object values.

2. The stepping motor controller as claimed in claim 1, wherein
   the object values of the driving current stored in the storage unit are determined by using a relation between the amount of operation and a driving torque of the stepping motor for driving the amount of operation, and a relation between the driving current and the driving torque generated by the driving current; and
   the object values of the driving current are stored in the storage unit in conjunction with the amounts of operation of the stepping motor, respectively.

3. A stepping motor controller for setting a driving current of a stepping motor, comprising:
   an accumulation unit configured to accumulate an amount of operation of the stepping motor; and
   a driving current setting unit configured to, when the amount of operation is greater than a predetermined value, determine a critical out-of-step current of the stepping motor by changing in increments the driving current of the stepping motor, and set the critical out-of-step current with a predetermined margin added thereto as an object driving current of the stepping motor.

4. The stepping motor controller as claimed in claim 3, further comprising a monitoring unit configured to monitor for an out-of-step state of the stepping motor provided with the driving current, and increase the driving current when the out-of-step state is detected.

5. A scanning apparatus, comprising:

a document scanning unit configured to scan a document;

an image data reader configured to convert an image on the document into image data;

a stepping motor configured to drive the document scanning unit to move; and a stepping motor controller for setting a driving current of the stepping motor, said stepping motor controller comprising:

a storage unit configured to store a plurality of object values of the driving current;

an accumulation unit configured to accumulate an amount of operation of the stepping motor; and a driving current setting unit configured to read out one of the object values corresponding to the amount of operation from the storage unit and to set the driving current to the one of the object values.

6. A scanning apparatus, comprising:

a document scanning unit configured to scan a document;

an image data reader configured to convert an image on the document into image data;

a stepping motor configured to drive the document scanning unit to move; and a stepping motor controller for setting a driving current of the stepping motor, said stepping motor controller comprising:

an accumulation unit configured to accumulate an amount of operation of the stepping motor; and a driving current setting unit configured to, when the amount of operation is greater than a predetermined value, determine a critical out-of-step current of the stepping motor by changing in increments the driving current of the stepping motor, and set the critical out-of-step current with a predetermined margin added thereto as an object driving current of the stepping motor.

7. An image forming apparatus, comprising:

an image forming device that irradiates a laser beam to a photoconductor to form a static latent image thereon, develops the static latent image, and transfers the developed static latent image to paper;

a stepping motor that drives a machinery portion of the image forming device to make mechanical motions; and a stepping motor controller for setting a driving current of the stepping motor, said stepping motor controller comprising:

a storage unit configured to store a plurality of object values of the driving current;

an accumulation unit configured to accumulate an amount of operation of the stepping motor; and a driving current setting unit configured to read out one of the object values corresponding to the amount of operation from the storage unit and to set the driving current to the one of the object values.

8. An image forming apparatus, comprising:

an image forming device that irradiates a laser beam to a photoconductor to form a static latent image thereon, develops the static latent image, and transfers the developed static latent image to paper;

a stepping motor that drives a machinery portion of the image forming device to make mechanical motions; and a stepping motor controller for setting a driving current of the stepping motor, said stepping motor controller comprising:

an accumulation unit configured to accumulate an amount of operation of the stepping motor; and a driving current setting unit configured to, when the amount of operation is greater than a predetermined value, determine a critical out-of-step current of the stepping motor by changing in increments the driving current of the stepping motor, and set the critical out-of-step current with a predetermined margin added thereto as an object driving current of the stepping motor.

9. A stepping motor controller for setting a driving current of a stepping motor, comprising:

storage means for storing a plurality of object values of the driving current;

accumulation means for accumulating an amount of operation of the stepping motor; and driving current setting means for reading out one of the object values corresponding to the amount of operation from the storage means and setting the driving current to the one of the object values.

10. The stepping motor controller as claimed in claim 9, wherein the object values of the driving current stored in the storage means are determined by using a relation between the amount of operation and a driving torque of the stepping motor for driving the amount of operation, and a relation between the driving current and the driving torque generated by the driving current; and the object values of the driving current are stored in the storage means in conjunction with the amounts of operation of the stepping motor, respectively.

11. A stepping motor controller for setting a driving current of a stepping motor, comprising:

accumulation means for accumulating an amount of operation of the stepping motor; and driving current setting means for, when the amount of operation is greater than a predetermined value, determining a critical out-of-step current of the stepping motor by changing in increments the driving current of the stepping motor, and setting the critical out-of-step current with a predetermined margin added thereto as an object driving current of the stepping motor.

12. The stepping motor controller as claimed in claim 11, further comprising monitoring means for monitoring for an out-of-step state of the stepping motor provided with the driving current, and increasing the driving current when the out-of-step state is detected.

* * * * *